US011583930B2

(12) United States Patent
Lin et al.

(10) Patent No.: US 11,583,930 B2
(45) Date of Patent: Feb. 21, 2023

(54) APPARATUS FOR AND PROCESS OF ADDITIVE MANUFACTURING

(71) Applicant: The University of Manchester, Manchester (GB)

(72) Inventors: Li Lin, Stockport (GB); Wei Chao, Manchester (GB); Zhang Xiaoji, Manchester (GB)

(73) Assignee: THE UNIVERSITY OF MANCHESTER, Manchester (GB)

( * ) Notice: Subject to any disclaimer, the term of this patent is extended or adjusted under 35 U.S.C. 154(b) by 648 days.

(21) Appl. No.: 16/608,735

(22) PCT Filed: Apr. 26, 2018

(86) PCT No.: PCT/GB2018/051093
§ 371 (c)(1),
(2) Date: Oct. 25, 2019

(87) PCT Pub. No.: WO2018/197876
PCT Pub. Date: Nov. 1, 2018

(65) Prior Publication Data
US 2021/0094102 A1  Apr. 1, 2021

(30) Foreign Application Priority Data

Apr. 26, 2017 (GB) ..................................... 1706645
Jan. 17, 2018 (GB) ..................................... 1800743

(51) Int. Cl.
*B33Y 10/00* (2015.01)
*B33Y 30/00* (2015.01)
(Continued)

(52) U.S. Cl.
CPC .............. *B22F 10/68* (2021.01); *B22F 10/28* (2021.01); *B22F 12/53* (2021.01); *B22F 12/60* (2021.01);
(Continued)

(58) Field of Classification Search
CPC ... B29C 64/153; B29C 64/165; B29C 64/194; B29C 64/205–218; B29C 64/336;
(Continued)

(56) References Cited

U.S. PATENT DOCUMENTS 6,363,606 B1 * 4/2002 Johnson, Jr. .......... B29C 64/165
29/854
6,861,613 B1  3/2005 Meiners
(Continued)

FOREIGN PATENT DOCUMENTS

DE      4216502 C1    11/1993
GB      2548340 A      9/2017
(Continued)

OTHER PUBLICATIONS

International Search Report and Written Opinion for PCT/GB2018/051093 dated Jul. 9, 2018 titled "Apparatus for and Process of Additive Manufacturing".

*Primary Examiner* — Mary Lynn F Theisen
(74) *Attorney, Agent, or Firm* — Hamilton, Brook, Smith & Reynolds, P.C.

(57) ABSTRACT

An apparatus (100) for additive manufacturing of a part of an article from a first material comprising particles having a first composition is provided. The apparatus (100) comprises a layer providing means (110) for providing a first support layer from a second material comprising particles having a second composition, wherein the first composition and the second composition are different. The apparatus (100) comprises a concavity defining means (120) for defining a first concavity in an exposed surface of the first support layer. The apparatus (100) comprises a depositing means (130) for depositing a part of the first material in the first concavity defined in the first support layer. The apparatus (100) comprises a levelling means (140) for selectively levelling the deposited first material in the first concavity. The appa-
(Continued)

ratus (100) comprises a first fusing means (150) for fusing some of the particles of the levelled first material in the first concavity by at least partially melting said particles, thereby forming a first part of the layer of the article. In this way, the second material may be thus used to provide a support structure during additive manufacturing of the part of the article.

20 Claims, 22 Drawing Sheets

(51) Int. Cl.
| | |
|---|---|
| *B33Y 40/00* | (2020.01) |
| *B29C 64/153* | (2017.01) |
| *B29C 64/165* | (2017.01) |
| *B29C 64/194* | (2017.01) |
| *B29C 64/336* | (2017.01) |
| *B22F 10/68* | (2021.01) |
| *B23K 26/342* | (2014.01) |
| *B29C 64/245* | (2017.01) |
| *B29C 64/35* | (2017.01) |
| *B29C 64/218* | (2017.01) |
| *B22F 12/53* | (2021.01) |
| *B22F 12/60* | (2021.01) |
| *B22F 10/28* | (2021.01) |

(52) U.S. Cl.
CPC .......... *B23K 26/342* (2015.10); *B29C 64/153* (2017.08); *B29C 64/165* (2017.08); *B29C 64/194* (2017.08); *B29C 64/218* (2017.08); *B29C 64/245* (2017.08); *B29C 64/336* (2017.08); *B29C 64/35* (2017.08); *B33Y 10/00* (2014.12); *B33Y 30/00* (2014.12); *B33Y 40/00* (2014.12)

(58) Field of Classification Search
CPC ......... B29C 64/40; B22F 10/28; B33Y 10/00; B33Y 30/00; B33Y 40/00
See application file for complete search history.

(56) References Cited

U.S. PATENT DOCUMENTS

| | | | |
|---|---|---|---|
| 2004/0099983 | A1 | 5/2004 | Dirscherl |
| 2011/0287185 | A1 | 11/2011 | Felstead |
| 2016/0052016 | A1* | 2/2016 | Te ..................... B05D 3/002 118/44 |
| 2018/0236731 | A1* | 8/2018 | Natarajan .............. B33Y 40/00 |
| 2020/0122390 | A1* | 4/2020 | Zivcec .................. B29C 64/165 |

FOREIGN PATENT DOCUMENTS

| | | |
|---|---|---|
| WO | 2015151834 A1 | 10/2015 |
| WO | 2015171182 A1 | 11/2015 |

* cited by examiner

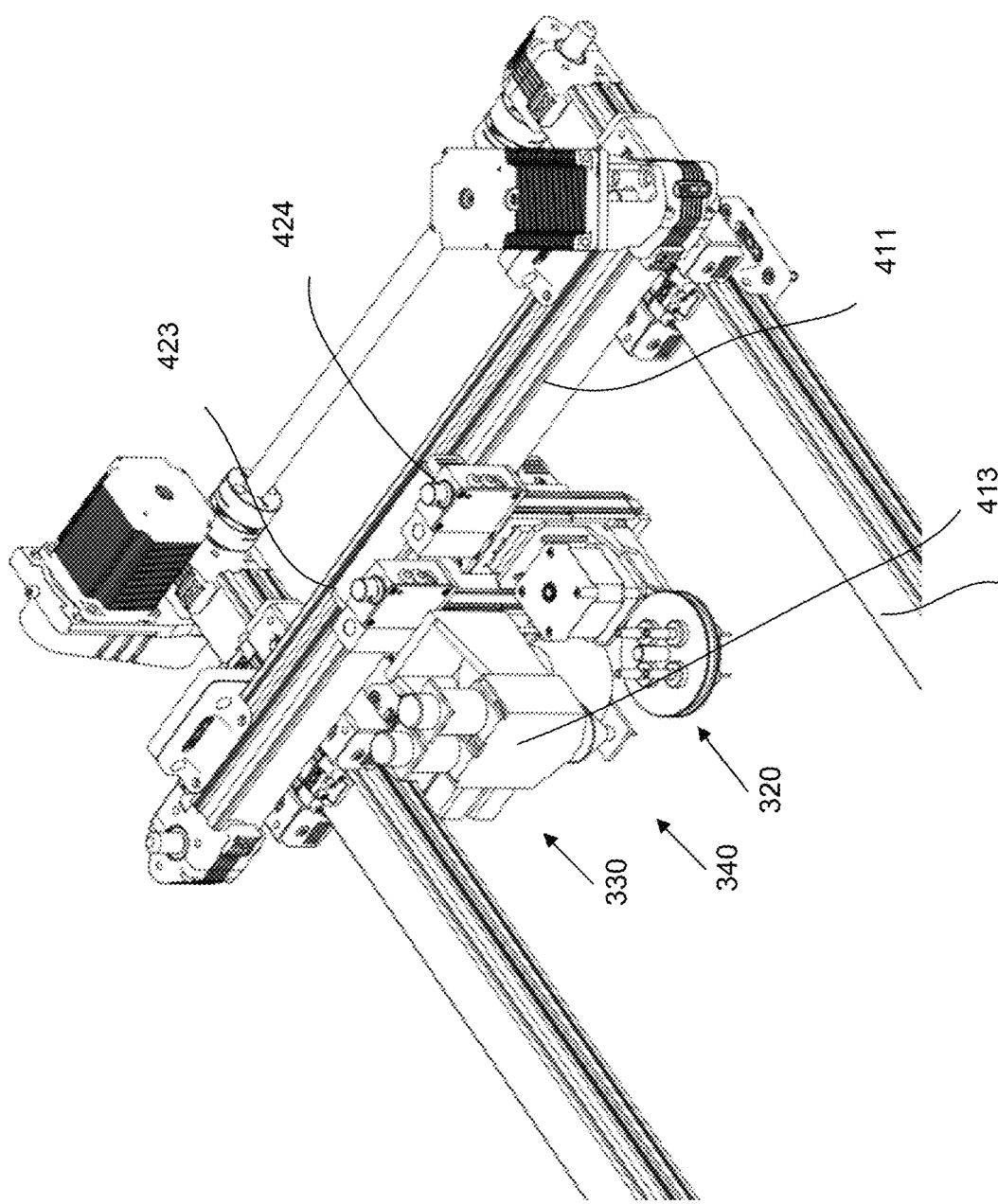

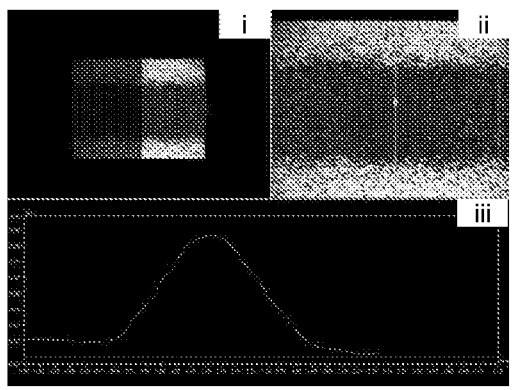
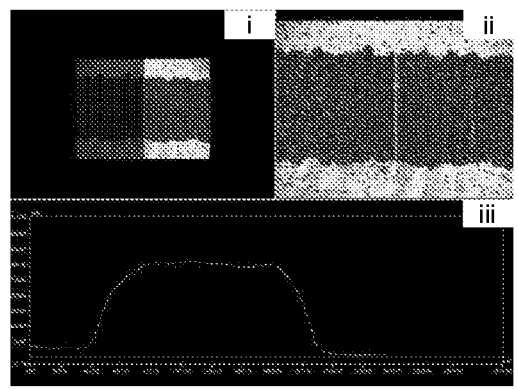
Fig. 10A                Fig. 10B
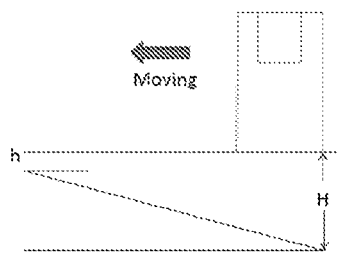
Fig. 10C
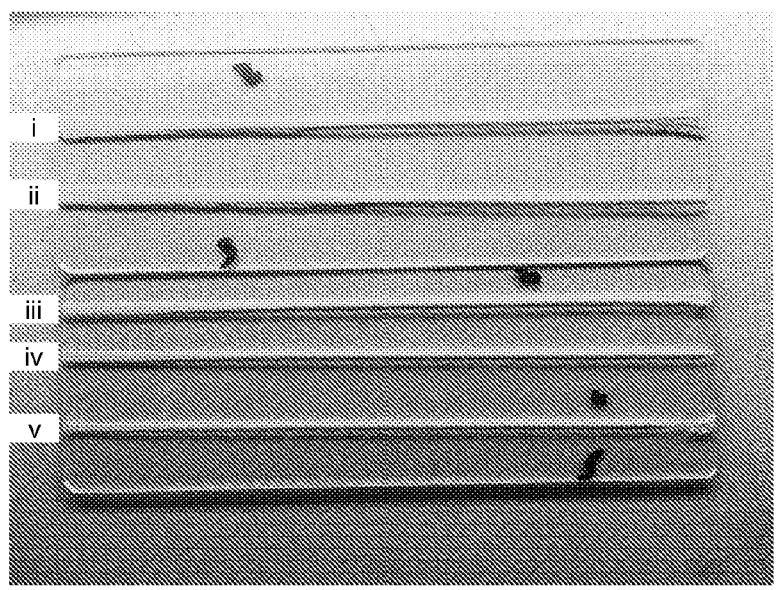
Fig. 10D

APPARATUS FOR AND PROCESS OF ADDITIVE MANUFACTURING

This application is the U.S. National Stage of International Application No. PCT/GB2018/051093, filed Apr. 26, 2018, which designates the U.S., published in English and claims priority under 35 U.S.C. § 119 or 365(c) to Great Britain Application No. 1800743.5 filed on Jan. 17, 2018 and to Great Britain Application No. 1706645.7, filed Apr. 26, 2017. The entire teachings of the above applications are incorporated herein by reference.

FIELD

The present invention relates to additive manufacturing, such as powder bed fusion.

BACKGROUND TO THE INVENTION

Additive manufacturing (AM), popularly known as three-dimensional (3D) printing, generally refers to processes used to create articles or objects from layers of material sequentially formed under computer control. Additive manufacturing provides creation of articles having complex shapes, geometries or structures, including internal voids, that may not readily be formed according to conventional subtractive manufacturing processes, such as machining, or conventional casting or moulding processes. Materials suitable for additive manufacturing include metals, ceramics, glasses and polymers.

ISO/ASTM52900-15 defines seven categories of additive manufacturing processes, including powder bed fusion. Particularly, powder bed fusion techniques, such as selective laser melting (SLM), are suitable for creation of, for example, metal articles. In order to create the relatively complex shapes of the articles, support structures may be required to support, at intermediate stages of additive manufacturing, the layers of material sequentially formed. The support structures may provide structural support and additionally or alternatively, may provide anchoring for overhanging structures, melt pool heat dissipation and/or prevention of thermally-induced distortions. In powder bed fusion techniques such as SLM, the support structures are formed from the same materials as the articles. Removal of the support structures after forming of the articles may be problematic since the support structures may be fused to the articles and/or situated in inaccessible internal voids. Further, since the support structures are formed from the same materials as the articles, material consumption is increased, thereby increasing cost. In addition, reuse or recycling of unfused materials may be precluded due to contamination and/or effects due to thermal cycling in these powder bed fusion techniques. Disposal of waste materials may be environmentally hazardous.

Furthermore, conventional SLM, as based on spreading a layer of material over a build platform using a roller or a blade followed by selective laser fusion for example, provides printing of only a single material in each particular layer, thereby limiting structure, function and/or properties of articles created in this way.

Hence, there is a need to improve additive manufacturing.

SUMMARY OF THE INVENTION

It is one aim of the present invention, amongst others, to provide an apparatus for and process of additive manufacturing which at least partially obviates or mitigates at least some of the disadvantages of the prior art, whether identified herein or elsewhere. For instance, it is an aim of embodiments of the invention to provide an apparatus for and a process of additive manufacturing that facilitates removal of support structures from articles thereby formed. For instance, it is an aim of embodiments of the invention to provide an apparatus for and process of additive manufacturing having reduced material consumption, that affords for reuse or recycling of unfused materials. For instance, it is an aim of embodiments of the invention to provide an apparatus for and process of additive manufacturing that permits forming of articles from a plurality of materials. For instance, it is an aim of embodiments of the invention to provide an apparatus for and process of additive manufacturing that permits forming of articles from a plurality of materials within a particular layer (i.e. intralayer) and/or in successive layers (i.e. interlayer).

A first aspect of the invention provides an apparatus for additive manufacturing of a part of an article from a first material comprising particles having a first composition, the apparatus comprising: a layer providing means for providing a first support layer from a second material comprising particles having a second composition, wherein the first composition and the second composition are different; a concavity defining means for defining a first concavity in an exposed surface of the first support layer; a depositing means for depositing a part of the first material in the first concavity defined in the first support layer; a levelling means for selectively levelling the deposited first material in the first concavity; and a first fusing means for fusing some of the particles of the levelled first material in the first concavity by at least partially melting said particles, thereby forming a first part of the layer of the article.

A second aspect of the invention provides a process of additive manufacturing of a part of an article from a first material comprising particles having a first composition, the process comprising steps of: (i) providing a first support layer from a second material comprising particles having a second composition, wherein the first composition and the second composition are different; (ii) defining a first concavity in an exposed surface of the first support layer; (iii) depositing a part of the first material in the first concavity defined in the first support layer; (iv) selectively levelling the deposited first material in the first concavity; (v) fusing at least some of the particles of the levelled first material by at least partially melting said particles, thereby forming a first part of a layer of the article; and optionally, repeating one or more of steps (i) to (v).

A third aspect of the invention provides an article manufactured according to the apparatus of the first aspect and/or the process of the second aspect.

A fourth aspect of the invention provides use of a second material comprising particles having a second composition as a support material for selective laser melting additive manufacturing of a part of an article from a first material comprising particles having a first composition.

A fifth aspect of the invention provides an apparatus for additive manufacturing of a part of an article from a first material comprising particles having a first composition, the apparatus comprising:

a layer providing means, comprising a retractable bed provided in a chamber and a roller or a scraper, for providing a first layer from a second material comprising particles having a second composition, wherein the first composition and the second composition are different;

a concavity defining means for defining a first concavity in an exposed surface of the first layer, wherein the concavity defining means comprises a vacuum apparatus having a vacuum nozzle arrangeable proximal the exposed surface of the first layer, wherein the vacuum apparatus is controllable to selectively remove a part of the second material by vacuum suction, thereby defining the first concavity in the exposed surface of the first layer;

a depositing means for depositing a part of the first material in the first concavity defined in the first layer, wherein the depositing means comprises a printing head including a deposition nozzle having an orifice;

a levelling means for selectively levelling the deposited first material in the first concavity; and a first fusing means for fusing some of the particles of the levelled first material in the first concavity by at least partially melting said particles, thereby forming a first part of the layer of the article.

A sixth aspect of the invention provides a process of additive manufacturing of a part of an article from a first material comprising particles having a first composition, the process comprising steps of:

(i) providing a first layer from a second material comprising particles having a second composition, wherein the first composition and the second composition are different;

(ii) defining a first concavity in an exposed surface of the first layer by vacuuming a part of the second material;

(iii) depositing a part of the first material in the first concavity defined in the first layer;

(iv) selectively levelling the deposited first material in the first concavity;

(v) fusing at least some of the particles of the levelled first material by at least partially melting said particles, thereby forming a first part of a layer of the article; and optionally, repeating one or more of steps (i) to (v).

DETAILED DESCRIPTION OF THE INVENTION

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like. The term "consisting of" or "consists of" means including the components specified but excluding other components. Whenever appropriate, depending upon the context, the use of the term "comprises" or "comprising" may also be taken to include the meaning "consists essentially of" or "consisting essentially of", and also may also be taken to include the meaning "consists of" or "consisting of". The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

The first aspect of the invention provides an apparatus for additive manufacturing of a part of an article from a first material comprising particles having a first composition, the apparatus comprising: a layer providing means for providing a first support layer from a second material comprising particles having a second composition, wherein the first composition and the second composition are different; a concavity defining means for defining a first concavity in an exposed surface of the first support layer; a depositing means for depositing a part of the first material in the first concavity defined in the first support layer; a levelling means for selectively levelling the deposited first material in the first concavity; and a first fusing means for fusing some of the particles of the levelled first material in the first concavity by at least partially melting said particles, thereby forming a first part of the layer of the article.

The fifth aspect of the invention provides an apparatus for additive manufacturing of a part of an article from a first material comprising particles having a first composition, the apparatus comprising: a layer providing means, comprising a retractable bed provided in a chamber and a roller or a scraper, for providing a first layer from a second material comprising particles having a second composition, wherein the first composition and the second composition are different; a concavity defining means for defining a first concavity in an exposed surface of the first layer, wherein the concavity defining means comprises a vacuum apparatus having a vacuum nozzle arrangeable proximal the exposed surface of the first layer, wherein the vacuum apparatus is controllable to selectively remove a part of the second material by vacuum suction, thereby defining the first concavity in the exposed surface of the first layer; a depositing means for depositing a part of the first material in the first concavity defined in the first layer, wherein the depositing means comprises a printing head including a deposition nozzle having an orifice; a levelling means for selectively levelling the deposited first material in the first concavity; and a first fusing means for fusing some of the particles of the levelled first material in the first concavity by at least partially melting said particles, thereby forming a first part of the layer of the article.

Generally, the apparatus according to the fifth aspect comprises and/or is a specific apparatus according to the first aspect. Hence, the part of the article, the first material, the particles having the first composition, the layer providing means, the first layer, the second material, the particles having the second composition, the concavity defining means, the first concavity, the exposed surface of the first layer, the depositing means, the levelling means and/or the first fusing means of the fifth aspect may be as otherwise described with respect to the first aspect, mutatis mutandis.

In this way, the apparatus for additive manufacturing of the part of an article involves selective material removal in each layer of the first material following the standard powder bed selective laser melting of the first material. This is then followed by selective point-by-point powder or powder-liquid material deposition of a second material, followed by selective laser melting or other means of joining of the second material, optionally including jetting of a polymeric binder. Multiple materials can be deposited in each layer using the said selective material deposition.

It should be understood that two different levelling means are used. The first levelling is a the roller or the scraper, for the levelling of the entire layer of the first material as in standard selective laser melting powder fusion process. The second levelling means (i.e. the levelling means) is for selectively levelling the deposited first material in the concavity. In this way, the deposited first material in the concavity may be levelled without interfering and/or contacting, for example, the exposed surface of the second material. It should be understood that the levelling means is for selectively levelling the deposited first material in the first concavity. In this way, the deposited first material in the first concavity may be levelled without interfering and/or contacting, for example, the exposed surface of the first layer provided from the second material comprising particles having the second composition. That is, the levelling means is for local levelling of the deposited first material in the first concavity. In contrast, conventional rollers or scraper for levelling the second material, for example, are not for selective or local levelling. Rather, such conventional rollers or scrapers extend at least across the entire article and would result in cross-contamination of the first material and the second material. In one example, the levelling means is arranged to selectively level the deposited first material in the first concavity. In one example, the levelling means is arranged to locally level the deposited first material in the first concavity. In one example, the levelling means is arranged to level the deposited first material in the first concavity at a resolution and/or a scale of the first concavity. In one example, the levelling means is arranged to extend across at most a width of the first concavity. In one example, the levelling means is arranged to level only the deposited first material in the first concavity. In one example, the levelling means is arranged to level an exposed surface of the deposited first material coincidently with the exposed surface of the first support layer. In this way exposed surface of the part of the deposited first material is coplanar with the exposed surface of the first support layer. For example, the depositing means may comprise another roller or scraper, such as a blade or a knife, arranged to roll or wipe respectively across the deposited first material during deposition thereof, thereby forming a layer of the first material in the first concavity having a same thickness as the first layer. In one example, the levelling means is arranged to selectively level the deposited first material in the first concavity concurrently, for example simultaneously, with depositing the part of the first material in the first concavity defined in the first support layer. In this way, deposition of the part of the first material by the depositing means and levelling thereof may be substantially simultaneous with and local to the deposited first material. In this way, contamination of the second material may be reduced while a number of steps required during the additive manufacturing process may be reduced. This process may be repeated for the following (i.e. subsequent) layers (i.e. that overlay the layer) until the entire article is formed. Third, fourth and more different types of materials may be deposited in a similar manner. Particularly, this permits forming of articles from a plurality of materials within a particular layer (i.e. intralayer) and/or in successive layers (i.e. interlayer), thereby enhancing structure, function and/or properties of articles created in this way.

In one example, the apparatus for additive manufacturing comprises an apparatus for powder bed fusion. In one example, the apparatus for additive manufacturing is an apparatus for powder bed fusion. In one example, the apparatus for additive manufacturing comprises an apparatus for SLM. In one example, the apparatus for additive manufacturing is an apparatus for SLM.

It should be understood that the first material provides a build material, from which the part of the article is formed. In contrast, the second material provides a support material, arrangeable to support the build material during, for example, intermediate stages of additive manufacturing. The second material may be thus used to provide a support structure during additive manufacturing of the part of the article and/or of the article. The first material and the second material respectively comprise particles having the first composition and the second composition, which are different. Since the first composition and the second composition are different, their respective properties may be selected according to their respective uses, thereby facilitating removal of the second material, such as the support structure, while reducing consumption of the first material. Furthermore, reuse or recycling of the first material and/or the second material is improved since cross-contamination of the first material and the second material is reduced. More than one material may be printed using the same principle, using integrated multiple selective, point-by-point material deposition, selective material removal and standard powder bed laser fusion by selective laser melting.

Generally, support structures may be required to afford additive manufacturing of overhanging parts of articles, as is known in the art. However, in conventional additive manufacturing techniques based on SLM for example, the support structures are formed from the same build materials, making their removal post additive manufacturing problematic. This results from the support structures have the same properties, such as the same physical, chemical and mechanical properties, as the supported articles, since the articles and the support structures are formed from the same build materials. Furthermore, these conventional additive manufacturing techniques increase consumption of the build materials, resulting in increased wastage and/or cost. In addition, contamination during these conventional additive manufacturing techniques of the build materials, such as unfused particles of the build materials, may preclude reuse and/or recycling of any recovered build materials.

In other words, by using a different material (i.e. the second material) from the build material (i.e. the first material) as the support structure material, support structures may be removed more easily than conventional additive manufacturing techniques, such as SLM, that use the same material as both the build material and the support material. It should be understood from the description herein that the support material may additionally and/or alternatively be a second build material. In this way, the second material may be included in the article. That is, the first support layer provided from the second material may be a first layer provided from the second material. At least a part of the second material may be thus included in the article, similarly to the first material.

In contrast to the conventional additive manufacturing techniques, the inventors have developed an apparatus for and method of additive manufacturing that exploits differences in properties, such as physical and/or chemical and/or mechanical properties, of the build material and the support material. That is, the build material and the support material may be complementary.

Typically, a greater proportion of material may be used as a support material than as a build material during an additive manufacturing process. According to this invention, the build material is provided only where required for forming the article, in contrast to conventional additive manufacturing techniques. Meanwhile, the remainder of a material requirement for the additive manufacturing process according to this invention is satisfied by the support material. Thus, the support material may be selected appropriately for use during the additive manufacturing process, such as to provide support structures that may be more readily removed from the formed article. Since the support material is not incorporated into the article, recycling or reuse of the support material is better enabled and contamination thereof is less problematic. The support material may be selected so as to improve the additive manufacturing process, for example, by controlling thermal properties, such as thermal conduction, of support structures formed therefrom. The support material may also be selected so as to reduce cost of the additive manufacturing process, particularly since an amount of the support material required may be greater than an amount of the build material used to form the article.

Generally, the first material and the second material may be selected such that their respective properties, such as physical and/or chemical and/or mechanical properties, are different. For example, the first material and the second material may have different thermal properties. For example, the first material and the second material may have different chemical reactivities and/or solubilities. For example, fused particles of the first material and the second material respectively may have different frangibilities.

The first material and the second material may be selected such that their respective temperatures of fusion are different. For example, a temperature of fusion, for example by sintering or melting, of the particles having the second composition of the second material (herein referred to as second particles for brevity) may be higher or lower than the temperature of fusion, by melting, of the particles having the first composition of the first material (herein referred to as first particles for brevity). In other words, the temperature of fusion of the second particles may be higher or lower than the melting temperature of the first particles. If the temperature of fusion of the second particles is higher than the melting temperature of the first particles, then the first particles may be fused by melting without fusing the second particles. In this way, the second particles may not be incorporated into the article. For example, any second particles remaining in or on the article, for example in open voids, may be readily removed, since they are not fused. Conversely, if the temperature of fusion of the second particles is lower than the melting temperature of the first particles, the second particles may be unfused, for example melted or separated, at a temperature lower than the melting temperature of the first particles. In this way, any second particles remaining in or on the article, for example in open voids, may be readily removed by heating these second particles to the temperature lower than the melting temperature of the first particles, whereby the second particles are unfused.

The first material and the second material may be selected such that their chemical reactivities and/or solubilities are different. For example, the second particles may be readily dissolvable in an acid or an alkaline solution while the first particles are inert in that solution. In this way, any second particles remaining in or on the article, for example in open voids, may be readily removed by dissolution or etching. The first material and the second material may be selected such that their respective mechanical properties and/or the respective mechanical properties of the fused first particles and fused second particles are different. For example, the fused second particles may be frangible while the fused first particles forming the article have superior mechanical properties. In this way, any fused second particles remaining in or on the article, for example in open voids, may be readily physically removed, such as by breakage thereof.

The first material may be a powder, paste, slurry or fluid, comprising the particles having the first composition. Preferably, the first material is a powder. These particles having the first composition are solid and may include discrete and/or agglomerated particles.

Generally, the first composition may comprise any material amenable to fusion by melting, such as metals or polymeric compositions. The first composition may comprise a metal, such as aluminium, titanium, chromium, iron, cobalt, nickel, copper, tungsten, silver, gold, platinum and/or an alloy thereof. Generally, the first composition may comprise any metal from which particles may be produced by atomisation. These first particles may be produced by atomisation, such as gas atomisation or water atomisation, or other processes known in the art. These first particles may have regular, such as spherical, shapes and/or irregular, such as spheroidal, flake or granular, shapes. The first composition may comprise a polymeric composition comprising a polymer, for example, a thermoplastic polymer. The thermoplastic polymer may be a homopolymer or a copolymer. The thermoplastic polymer may be selected from a group consisting of poly(methyl methacrylate) (PMMA), acrylonitrile butadiene styrene (ABS), aliphatic or semi-aromatic polyamides, polylactic acid (polylactide) (PLA), polybenzimidazole (FBI), polycarbonate (PC), polyether sulfone (PES), polyetherimide, polyethylene (PE), polypropylene (PP), polymethylpentene (PMP) and polybutene-1 (PB-1), polystyrene (PS) and polyvinyl chloride (PVC). The first composition may comprise a ceramic. The first composition may comprise a glass.

These first particles may have a size of at most 200 μm, at most 150 μm, at most 100 μm, at most 75 μm, at most 50 μm, at most 25 μm, at most 15 μm, at most 10 μm, at most 5 μm, or at most 1 μm. These particles may have a size of at least 150 μm, at least 100 μm, at least 75 μm, at least 50 μm, at least 25 μm, at least 15 μm, at least 10 μm, at least 5 μm, or at least 1 μm. Preferably, these particles have a size in a range 10 μm to 100 μm. More preferably, these particles have a size in a range 10 μm to 50 μm.

The first material may comprise an additive, an alloying addition, a flux, a binder and/or a coating. The first material may comprise particles having different compositions, for example a mixture of particles having different compositions.

The second material may be a powder, paste, slurry or fluid, comprising the second particles. Preferably, the second material is a powder. These second particles are solid and may include discrete and/or agglomerated particles.

Generally, the second composition may comprise any material complementary to the first composition, as described above. Thus, the second composition may comprise a metal or a ceramic or mixtures thereof, or a polymeric composition comprising a polymer. The second composition may comprise a metal, for example aluminium, titanium, chromium, iron, cobalt, nickel, copper, tungsten, and/or an alloy thereof. Generally, the second composition may comprise any metal from particles may be produced by atomisation. These second particles comprising a metal may comprise a coating, for example a polymeric composition comprising a polymer. Such second particles may be fused by melting the coating at a temperature lower than the melting temperature of the first particles. The second composition may comprise a brazing material, for example a brazing alloy based on aluminium-silicon, copper-silver, copper-zinc, copper-tin, or amorphous brazing alloys. Such second particles may typically have melting temperatures lower than the melting temperature of the first particles. The second composition may comprise a ceramic, for example a refractory material, sand, $SiO_2$, $SiC$, $Al_2O_3$, $Si_2N_3$, $ZrO_2$. Such second particles may typically have melting temperatures higher than the melting temperature of the first particles.

The second composition may comprise a polymeric composition comprising a polymer, for example, a thermoplastic polymer. The first composition may comprise a polymeric composition comprising a polymer, for example, a thermoplastic polymer. The thermoplastic polymer may be a homopolymer or a copolymer. The thermoplastic polymer may be selected from a group consisting of poly(methyl methacrylate) (PMMA), acrylonitrile butadiene styrene (ABS), aliphatic or semi-aromatic polyamides, polylactic acid (polylactide) (PLA), polybenzimidazole (PBI), polycarbonate (PC), polyether sulfone (PES), polyetherimide, polyethylene (PE), polypropylene (PP), polymethylpentene (PMP) and polybutene-1 (PB-1), polystyrene (PS) and polyvinyl chloride (PVC).

These particles having the second composition may be produced by atomisation, such as gas atomisation or water atomisation, or other processes known in the art. These particles may have regular, such as spherical, shapes and/or irregular, such as spheroidal, flake or granular, shapes.

These particles having the second composition may have a size of at most 200 μm, at most 150 μm, at most 100 μm, at most 75 μm, at most 50 μm, at most 25 μm, at most 15 μm, at most 10 μm, at most 5 μm, or at most 1 μm. These particles may have a size of at least 150 μm, at least 100 μm, at least 75 μm, at least 50 μm, at least 25 μm, at least 15 μm, at least 10 μm, at least 5 μm, or at least 1 μm. Preferably, these particles have a size in a range 10 μm to 100 μm. More preferably, these particles have a size in a range 10 μm to 50 μm.

The second material may comprise an additive, a binder or a coating. For example, the second material may comprise carbon, graphite flakes, carbon fibres, graphene, carbon nanotubes to control thermal conduction of the second material. The second material may comprise particles having different compositions, for example a mixture of particles having different compositions, such as a mixture of ceramic and coated metal particles or a mixture of ceramic and brazing material particles.

The layer providing means for providing the first support layer from the second material may be as known to the person skilled in the art for providing layers in powder bed apparatus. Typically, a layer is conventionally provided in a powder bed apparatus by dispensing material, such as the second material, across a substrate, which may include a previously provided layer, on a retractable bed. A roller or scraper, such as a blade or a knife, rolls or wipes across the dispensed material, thereby forming the layer having a uniform thickness. Successive layers are provided by retracting the bed and repeating the dispensing and wiping.

In one example, the layer providing means comprises a first retractable bed provided in a first chamber. Generally, retractable beds are slidably arranged, for example as bases, in chambers and arranged to slidably displace therein. Retraction may be considered as displacement of the retractable beds away from open ends of the chambers. Conversely, the retractable beds may be displaced towards the open ends of the chambers. The first retractable bed provides a base or substrate upon which the additive manufacturing process may be performed. The layer providing means may comprise a second retractable bed provided in a second chamber. This second chamber may be arranged to receive a quantity of the second material. The layer providing means may comprise a scraper, arranged to transfer a portion of the second material received in the second chamber to the first retractable bed in the first chamber.

The first support layer may have a thickness (also known as depth) of at most 500 μm, at most 200 μm, at most 150 μm, at most 100 μm, at most 75 μm, at most 50 μm, at most 25 μm, at most 15 μm, at most 10 μm, at most 5 μm, or at most 1 μm. The first support layer may have a thickness of at least 150 μm, at least 100 μm, at least 75 μm, at least 50 μm, at least 25 μm, at least 15 μm, at least 10 μm, at least 5 μm, or at least 1 μm. Preferably, the first support layer has a thickness in a range 10 μm to 100 μm. More preferably, the first support layer has a thickness in a range 20 μm to 50 μm.

The first concavity in the exposed surface of the first support layer provides an open volume or void to receive the first material. The first concavity may at least in part surround the first material deposited therein, for example on 1, 2, 3, 4 or 5 sides. In this way, the second material may provide support for the first material during the additive manufacturing process. The first concavity in the exposed surface of the first support layer may comprise a recess, pit, well, slot, groove or furrow therein.

The concavity defining means for defining the first concavity in the exposed surface of the first support layer may include, for example, forming means and/or removal means. For example, said means may comprise a mechanical indenter arranged to define the first concavity by mechanical indentation of the first support layer. Such a mechanical indenter may be provided by a dot matrix head, for example. For example, said means may comprise vacuum, magnetic and/or electrostatic removal means.

In one example, the concavity defining means for defining the first concavity in the exposed surface of the first support layer comprises removing means for removing the part of the second material.

In one example, the concavity defining means for defining the first concavity in the exposed surface comprises a vacuum apparatus having a vacuum nozzle arrangeable proximal the exposed surface of the first support layer, wherein the vacuum apparatus is controllable to selectively remove a part of the second material by vacuum suction, thereby defining the first concavity in the exposed surface of the first support layer. The vacuum apparatus may be configured to remove at most a thickness or depth of the first support layer. The vacuum apparatus may be configured to define the first concavity having a flat base or bottom. A gas flow rate through the vacuum nozzle, a position of the vacuum nozzle, a separation of the vacuum nozzle from the exposed surface of the first support layer and/or a speed of movement of the vacuum nozzle may be controllable, for example by the apparatus, to define, at least in part, a shape of the first concavity. A bore, an internal shape, an external shape and/or an internal diameter of the vacuum nozzle may be selected to define, at least in part, the shape of the first concavity. For example, a width of the first concavity may be proportional, for example directly proportional, to the internal diameter of the vacuum nozzle.

The vacuum nozzle may have an internal diameter of at most 1500 μm, at most 1250 μm, at most 840 μm, at most 600 μm, at most 510 μm, at most 410 μm, at most 340 μm, at most 260 μm, at most 210 μm, at most 150 μm, at most 100 μm, at most 60 μm, at most 25 μm, or at most 10 μm. The vacuum nozzle may have an internal diameter of at least 1500 μm, at least 1250 μm, at least 840 μm, at least 600 μm, at least 510 μm, at least 410 μm, at least 340 μm, at least 260 μm, at least 210 μm, at least 150 μm, at least 100 μm, at least 60 μm, at least 25 μm, or at least 10 μm. Preferably, the vacuum nozzle has an internal diameter of at most 600 μm. Preferably, the vacuum nozzle has an internal diameter in a range 10 μm to 800 μm. More preferably, the vacuum nozzle has an internal diameter in a range 50 μm to 600 μm.

The concavity defining means may be arranged to define the first concavity having a width of at most 3000 μm, 2500 μm, 2000 μm, 1500 μm, at most 1250 μm, at most 1000 μm, at most 750 μm, at most 500 μm, at most 400 μm, at most 300 μm, at most 250 μm, at most 200 μm, at most 150 μm, at most 100 μm, at most 50 μm, at most 25 μm, or at most 10 μm. The concavity defining means may be arranged to define the first concavity having a width of at least 3000 μm, 2500 μm, 2000 μm, 1500 μm, at least 1250 μm, at least 1000 μm, at least 750 μm, at least 500 μm, at least 400 μm, at least 300 μm, at least 250 μm, at least 200 μm, at least 150 μm, at least 100 μm, at least 50 μm, at least 25 μm, or at least 10 μm.

The concavity defining means may be arranged to move, for example translate in 1 axis and/or in 2 or 3 orthogonal axes and/or rotate about 1 axis and/or about 2 or 3 orthogonal axes. In this way, the concavity defining means may be define the first concavity in the exposed surface of the first support layer according to, for example, as defined by a pattern for a shape of the part of the article. The concavity defining means may comprise a gantry, such as a 2, 3, 4, 5, or 6 axis gantry arranged to provide such movement. In this way, a separation of the vacuum nozzle from the exposed surface of the first layer may be controlled. The concavity defining means may comprise an x-y or an x-y-z motion control.

The concavity defining means may be arranged to move, for example translate, at a speed of at most 0.5 mm/s, at most 1 mm/s, at most 2 mm/s, at most 3.33 mm/s, at most 5 mm/s, at most 6.67 mm/s, at most 8.33 mm/s, at most 10 mm/s, at most 20 mm/s, at most 30 mm/s, at most 50 mm/s, at most 75 mm/s, at most 100 mm/s, or at most 200 mm/s. The concavity defining means may be arranged to move, for example translate, at a speed of at least 0.5 mm/s, at least 1 mm/s, at least 2 mm/s, at least 3.33 mm/s, at least 5 mm/s, at least 6.67 mm/s, at least 8.33 mm/s, at least 10 mm/s, at least 20 mm/s, at least 30 mm/s, at least 50 mm/s, at least 75 mm/s, at least 100 mm/s, or at least 200 mm/s.

The concavity defining means may comprise a plurality of vacuum nozzles, as described above, having different geometries. A vacuum nozzle of the plurality of vacuum nozzles may be selectable. For example, the plurality of vacuum nozzles may be arranged on a rotatable disk and a vacuum nozzle of the plurality of vacuum nozzles may be selected by rotating the vacuum nozzle to a desired position. Suction through the selected vacuum nozzle may be individually controlled, for example via a solenoid operated N-way valve. Each vacuum nozzle of the plurality of vacuum nozzles may be separately fluidically coupled to a different particle tank, such that different materials may be isolated in different particle tanks. In this way, contamination between materials may be reduced, allowing reuse or recycling of the collected materials. A vacuum nozzle, for example of the plurality of vacuum nozzles, may be arranged to move, for example translate, above the exposed surface of the first layer at a height of at most 0.1 mm, at most 0.2 mm, at most 0.3 mm, at most 0.4 mm, at most 0.5 mm, at most 0.6 mm, at most 0.7 mm, at most 0.8 mm, at most 0.9 mm, at most 1.0 mm, at most 1.5 mm, at most 2 mm, at most 3 mm, or at most 5 mm. The vacuum nozzle may be arranged to move, for example translate, above the exposed surface of the first layer at a height of at least 0.1 mm, at least 0.2 mm, at least 0.3 mm, at least 0.4 mm, at least 0.5 mm, at least 0.6 mm, at least 0.7 mm, at least 0.8 mm, at least 0.9 mm, at least 1.0 mm, at least 1.5 mm, at least 2 mm, at least 3 mm, or at least 5 mm. Preferably, the vacuum nozzle is arranged to move, for example translate, above the exposed surface of the first layer at a height in a range 0.5 mm to 1.5 mm, for example 1 mm. In other words, the vacuum nozzle is arranged to move above the exposed surface, separated by a gap (i.e. the height). In this way, control of a shape of the first concavity may be improved.

The depositing means for depositing a part of the first material in the first concavity defined in the first support layer may comprise a printing head, arranged to deposit the part of the first material in the first concavity. Other depositing means may be known in the art.

The printing head may comprise at least one of a material feeder, a material mixer, a material depositor and a deposition nozzle. A quantity of the first material may be stored in the material feeder. The material feeder may be, for example, a screw feeder, as may be used for powder materials. Additionally and/or alternatively, the material feeder may comprise a hopper, arranged to receive the first material. A plurality of such material feeders may be provided, thereby providing for depositing of a plurality of different materials.

The material mixer may comprise a blender, arranged to blend a plurality of different materials received from the plurality of material feeders, thereby providing a blended first material. In this way, a functionally graded first material may be provided, in which a blend of the first material is different in different layers of the article. The first material or the blended first material may be provided to the material depositor.

The material depositor may comprise, for example, an ultrasonic dispenser. Ultrasonic dispensers are vibration-based material depositors, configured to dispense materials due to ultrasonic vibration. Vibration-based depositors may be particularly suitable for selectively depositing material in the context of this invention. Such an ultrasonic dispenser may comprise a piezoelectric transducer coupled via a coupling member to the deposition nozzle. The ultrasonic dispenser may further comprise an ultrasonic frequency generator coupled to the piezoelectric transducer. By controlling vibration of the ultrasonic dispenser, a rate of dispensing of the first material may be controlled. Other material depositors may be known in the art.

The deposition nozzle may comprise an orifice through which the part of the first material in the first concavity defined in the first support layer is deposited. The deposition nozzle may provide a passageway for the first material from the material depositor.

The deposition nozzle may have an internal diameter, for example a diameter of the orifice, of at most 1000 μm, at most 750 μm, at most 500 μm, at most 400 μm, at most 300 μm, at most 200 μm, at most 100 μm, at most 75 μm, at most 50 μm, at most 25 μm or at most 10 μm. The deposition nozzle may have an internal diameter of at least 1000 μm, at least 750 μm, at least 500 μm, at least 400 μm, at least 300 μm, at least 200 μm, at least 100 μm, at least 75 μm, at least 50 μm, at least 25 μm or at least 10 μm. Preferably, the deposition nozzle has an internal diameter of at least 200 μm. Preferably, the deposition nozzle has an internal diameter in a range 200 μm to 750 μm. More preferably, the deposition nozzle has an internal diameter in a range 300 μm to 500 μm. A ratio between the internal diameter of the deposition nozzle and a particle size, for example of the first particles, is preferably from 5 to 10 in order to get a more constant flowrate of the first material.

The depositing means may be arranged to move, for example translate in 1 axis and/or in 2 or 3 orthogonal axes and/or rotate about 1 axis and/or about 2 or 3 orthogonal axes. In this way, the depositing means may be arranged to deposit the part of the first material in the first concavity, for example only in the first concavity. In this way, a separation of the depositing nozzle from the first concavity and/or exposed surface of the first layer may be controlled. The depositing means may comprise a gantry, such as a 2, 3, 4, 5, or 6 axis gantry arranged to provide such movement. The depositing means may comprise an xyz motion apparatus configured to deposit the part of the first material in the first concavity in a required location and/or in a required amount.

The depositing means may be arranged to move, for example translate, at a speed of at most 0.5 mm/s, at most 1 mm/s, at most 2 mm/s, at most 3.33 mm/s, at most 5 mm/s, at most 6.67 mm/s, at most 8.33 mm/s, at most 10 mm/s, at most 20 mm/s, at most 30 mm/s, at most 50 mm/s, at most 75 mm/s, at most 100 mm/s, or at most 200 mm/s. The depositing means may be arranged to move, for example translate, at a speed of at least 0.5 mm/s, at least 1 mm/s, at least 2 mm/s, at least 3.33 mm/s, at least 5 mm/s, at least 6.67 mm/s, at least 8.33 mm/s, at least 10 mm/s, at least 20 mm/s, at least 30 mm/s, at least 50 mm/s, at least 75 mm/s, at least 100 mm/s, or at least 200 mm/s. Preferably, the depositing means is arranged to move at a speed in a range 2 mm/s to 10 mm/s. More preferably, the depositing means may be arranged to move, for example translate, at a speed in a range 3.33 mm/s to 8.33 mm/s.

The depositing means may be arranged to move, for example translate, above the exposed surface of the first layer and/or above a base of the first cavity at a height of at most 0.1 mm, at most 0.2 mm, at most 0.3 mm, at most 0.4 mm, at most 0.5 mm, at most 0.6 mm, at most 0.7 mm, at most 0.8 mm, at most 0.9 mm, at most 1.0 mm, at most 1.5 mm, at most 2 mm, at most 3 mm, or at most 5 mm. The depositing means may be arranged to move, for example translate, above the exposed surface of the first layer and/or above a base of the first cavity at a height of at least 0.1 mm, at least 0.2 mm, at least 0.3 mm, at least 0.4 mm, at least 0.5 mm, at least 0.6 mm, at least 0.7 mm, at least 0.8 mm, at least 0.9 mm, at least 1.0 mm, at least 1.5 mm, at least 2 mm, at least 3 mm, or at least 5 mm. Preferably, the depositing means is arranged to move, for example translate, above the exposed surface of the first layer and/or above a base of the first cavity at a height in a range 0.2 mm to 1 mm.

The depositing means may be configured to deposit at most a thickness or depth of the first support layer. A flow rate of the first material through the deposition nozzle, a position of the deposition nozzle, a separation of the deposition nozzle from the exposed surface of the first support layer and/or the concavity and/or a speed of movement of the deposition nozzle may be controllable, for example by the apparatus. A bore, an internal shape, an external shape and/or an internal diameter of the deposition nozzle may be selected to define, at least in part, a shape the part of the first material deposited in the first concavity.

The levelling means is for selectively levelling the deposited first material in the first concavity. In one example, the levelling means is arranged to level an exposed surface of the deposited first material coincidently with the exposed surface of the first support layer. In this way exposed surface of the part of the deposited first material is coplanar with the exposed surface of the first support layer. For example, the depositing means may comprise another roller or scraper, such as a blade or a knife, arranged to roll or wipe respectively across the deposited first material during deposition thereof, thereby forming a layer of the first material in the first concavity having a same thickness as the first layer.

In one example, the levelling means is coupled to the depositing means. In one example, the deposition nozzle comprises a deposition scraper (i.e. the levelling means) arranged proximal the orifice of the disposition nozzle. The deposition scraper may comprise an annulus. The annulus may be arranged to scrape the first material during deposition thereof. The annulus may be provided, for example, by an outer sleeve around the deposition nozzle. The outer sleeve may project beyond an end of the deposition nozzle. The deposition scraper may have a size, for example a diameter, less than a width of the first concavity, for example 10%, 20%, 30%, 40%, 50%, 60%, 70%, 80%, or 90% less than the width of the first concavity. The deposition scraper may have a size, for example a diameter, substantially the same as a width of the first concavity. The deposition scraper may have a size, for example a diameter, greater than a width of the first concavity, for example 10%, 20%, 30%, 40%, 50%, 60%, 70%, 80%, 90% or 100% greater than the width of the first concavity. In this way, deposition of the part of the first material by the depositing means and levelling thereof may be substantially simultaneous with and local to the deposited first material. In this way, contamination of the second material may be reduced while a number of steps required during the additive manufacturing process may be reduced.

The levelling means may be arranged to move as described with respect to the depositing means.

In one example, the depositing means is arranged to deposit an amount of the first material required to fill, for example completely fill or exactly fill, the first concavity defined by the concavity defining means.

The first fusing means for fusing some of the particles of the deposited first material by at least partially melting said particles may comprise, for example, laser beam melting or electron beam melting, as known to the person skilled in the art. In one example, the first fusing means comprises selective laser melting (SLM).

In one example, the apparatus comprises a removing means for removing at least some unfused particles of the deposited first material. This removing means may be provided, for example, by the vacuum apparatus, as described above. This removing means may comprise imaging and identification means, such as a charge coupled device (CCD) camera, a controller and software, configured to identify any unfused particles of the deposited first material, which may be subsequently removed by the removing means. In this way, contamination of the second material may be reduced.

In one example, the apparatus comprises a second fusing means for fusing at least some of the particles of the second material. The second fusing means may be provided by, or similarly to, the first fusing means. In this way, support structures formed from the second particles may be provided having, for example, structural properties suitable for supporting the article or part thereof during the additive manufacturing process. For example, the at least some of the particles of the second material may be fused by melting or sintering.

In one example, the apparatus comprises a heating means for pre-heating the deposited first material or post-heating the formed first part of the layer of the article.

In one example, the apparatus comprises machining means for machining the formed first part of the layer of the article. For example, the machining means may comprise a grinding wheel and/or a milling head, whereby the formed first part of the layer of the article may be machined before deposition of another layer upon the formed first part of the layer of the article. In this way, quality and/or dimensional control of the article may be improved In one example, the apparatus comprises a layer reusing means for providing a part of the second material from another support layer. The layer reusing means comprise at least a part of the concavity defining means. The layer reusing means may comprise a separator configured to separate the second material from, for example, air. The layer reusing means may comprise a tank arranged to receive separated second material. In this way, the second material may be reused or recycled. The layer reusing means may be configured similarly for the first material.

In one example, the apparatus comprises a depositing means for depositing a part of a third material comprising particles having a third composition in a second concavity defined in the first support layer, wherein the first composition, the second composition and the third composition are different. In this way, multiple material additive manufacturing (MMAM) may be provided, allowing the article to be built from different particles having different compositions in different layers and/or in different regions of the same layer.

In one example, the apparatus comprises a process chamber in which the additive manufacturing process is performed. The process chamber may provide an inert or a reactive environment for the additive manufacturing process. For example, the process chamber may be evacuated and/or filled with an inert gas and/or a shield gas, so as to provide an inert atmosphere to reduce oxidation during melting of metals. For example, the process chamber may be evacuated and/or filled with a reactive gas, so as to provide a reactive atmosphere to enhance a deposition process.

In one example, the apparatus comprises a controller, arranged to control the apparatus. The controller may comprise hardware, electronics, a computer device having a memory and a processor, and/or software, arranged to control features of the apparatus. The controller may receive a model of the article and control the apparatus to create the article according to the model.

The second aspect of the invention provides a process of additive manufacturing of a part of an article from a first material comprising particles having a first composition, the process comprising steps of: (i) providing a first support layer from a second material comprising particles having a second composition, wherein the first composition and the second composition are different; (ii) defining a first concavity in an exposed surface of the first support layer; (iii) depositing a part of the first material in the first concavity defined in the first support layer; (iv) selectively levelling the deposited first material in the first concavity; (v) fusing at least some of the particles of the levelled first material by at least partially melting said particles, thereby forming a first part of a layer of the article; and optionally, repeating one or more of steps (i) to (v).

The sixth aspect of the invention provides a process of additive manufacturing of a part of an article from a first material comprising particles having a first composition, the process comprising steps of:

(i) providing a first layer from a second material comprising particles having a second composition, wherein the first composition and the second composition are different;

(ii) defining a first concavity in an exposed surface of the first layer by vacuuming a part of the second material;

(iii) depositing a part of the first material in the first concavity defined in the first layer;

(iv) selectively levelling the deposited first material in the first concavity;

(v) fusing at least some of the particles of the levelled first material by at least partially melting said particles, thereby forming a first part of a layer of the article; and optionally, repeating one or more of steps (i) to (v).

Generally, the process according to the sixth aspect comprises and/or is a specific process according to the second aspect. Hence, the part of the article, the first material, the particles having the first composition, the providing, the first layer, the second material, the particles having the second composition, the defining, the first concavity, the exposed surface of the first layer, the depositing, the selectively levelling and/or the fusing of the sixth aspect may be as otherwise described with respect to the second aspect, mutatis mutandis.

In this way, the process may be repeated for the following (i.e. subsequent) layers (i.e. that overlay the layer) until the entire article is formed. Third, fourth and more different types of materials may be deposited in a similar manner. Particularly, this permits forming of articles from a plurality of materials within a particular layer (i.e. intralayer) and/or in successive layers (i.e. interlayer), thereby enhancing structure, function and/or properties of articles created in this way.

In one example, the process comprises a step of removing at least some unfused particles of the deposited first material. In one example, the process comprises a step of fusing at least some of the particles of the second material. In one example, the process comprises a step of pre-heating the deposited first material before the step of fusing. In one example, the process comprises a step of post-heating the formed first part of the layer of the article. In one example, the process comprises a step of machining the formed first part of the layer of the article. In one example, the step defining the first concavity in the exposed surface of the first support layer comprises removing the part of the second material to at most a depth of the first support layer. In one example, removing the part of the second material comprises vacuuming the part of the second material. In one example, the step of levelling the deposited first material in the first material comprises levelling an exposed surface of the part of the deposited first material coincidently with the exposed surface of the first support layer. In one example, the step of fusing some of the particles of the deposited first material comprises selective laser melting (SLM) thereof. In one example, a part of the second material is obtained from another support layer. In one example, the process comprises steps of: (vi) defining a second concavity in the first support layer; (vii) depositing a part of a third material comprising particles having a third composition in the second concavity defined in the first support layer, wherein the first composition, the second composition and the third composition are different; (viii) selectively levelling the deposited first material in the first concavity; and (ix) fusing a part of the deposited third material, thereby forming a second part of the layer of the article from the fused part of the second material. In one example, the process comprises any step or step as described in relation to the first aspect.

The third aspect of the invention provides an article manufactured according to the second aspect.

The fourth aspect of the invention provides use of a second material comprising particles having a second composition as a support material for selective laser melting additive manufacturing of a part of an article from a first material comprising particles having a first composition. The first material and the second material may be as described herein.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which:

FIGS. 4A to 4C schematically depict parts of the apparatus according to FIG. 3, in more detail;

FIGS. 10A to 10D depict results of first material deposited by the apparatus according to FIG. 3;

DETAILED DESCRIPTION OF THE DRAWINGS

Figure 1:
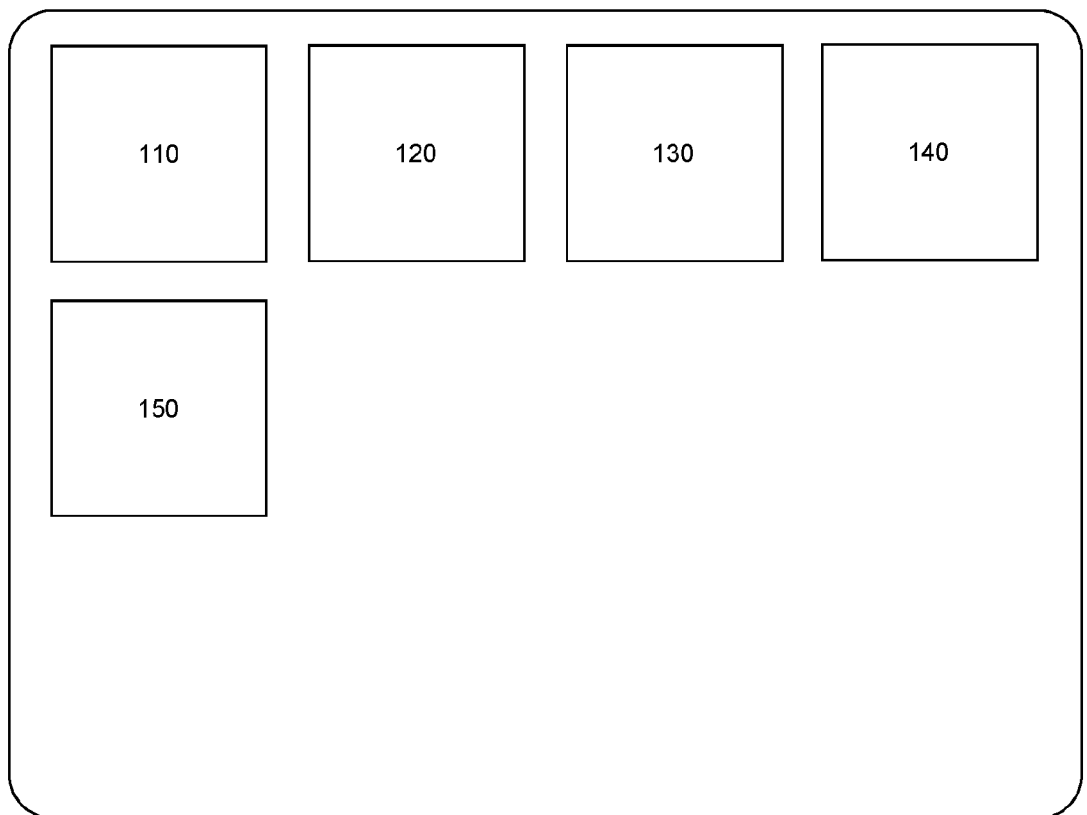
FIG. 1 schematically depicts an apparatus according to an exemplary embodiment of the invention.

FIG. 1 schematically depicts an apparatus 100, for additive manufacturing of a part of an article from a first material comprising particles having a first composition, according to an exemplary embodiment of the invention. Particularly, the apparatus 100 comprises a layer providing means 110 for providing a first support layer from a second material comprising particles having a second composition, wherein the first composition and the second composition are different, a concavity defining means 120 for defining a first concavity in an exposed surface of the first support layer, a depositing means 130 for depositing a part of the first material in the first concavity defined in the first support layer, a levelling means 140 for selectively levelling the deposited first material in the first concavity, and a first fusing means 150 for fusing some of the particles of the levelled first material in the first concavity by at least partially melting said particles, thereby forming a first part of the layer of the article. Since the first composition and the second composition are different, their respective properties may be selected according to their respective uses, their facilitating removal of the second material, such as the support structure, while reducing consumption of the first material. Furthermore, reuse or recycling of the first material and/or the second material is improved since cross-contamination of the first material and the second material is reduced.

Figure 2:
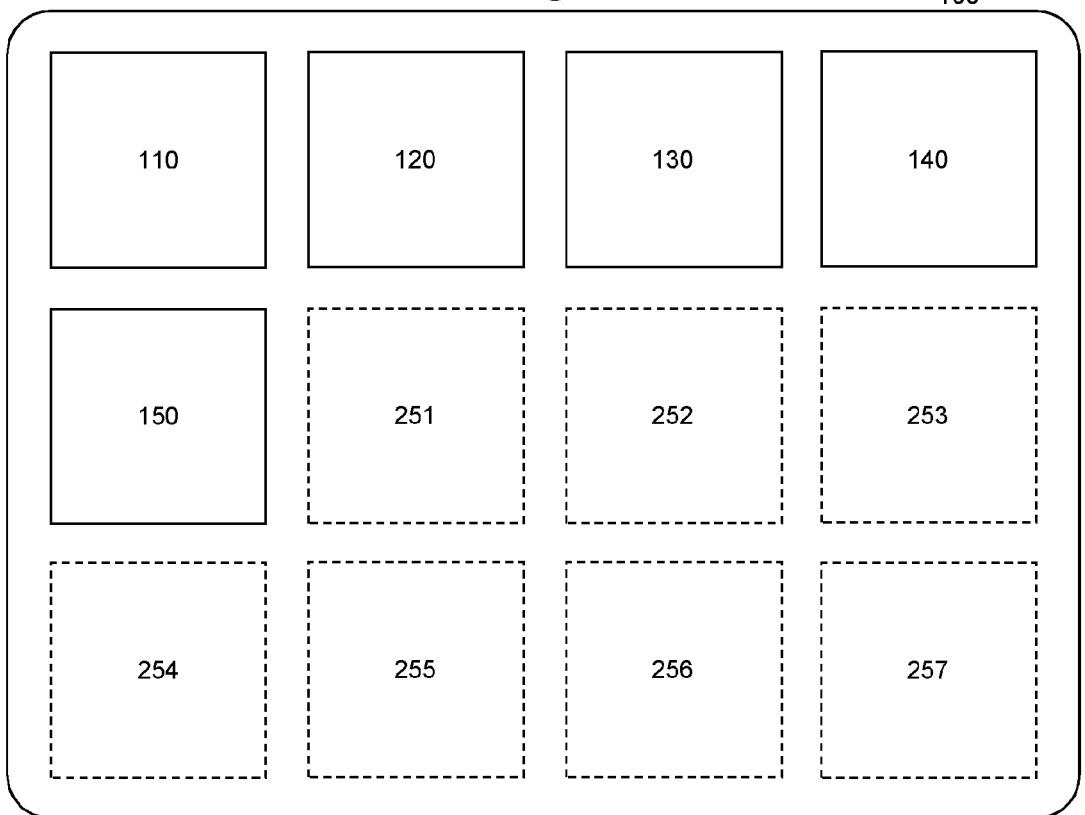
FIG. 2 schematically depicts the apparatus according to FIG. 1, in more detail.

FIG. 2 schematically depicts the apparatus according to FIG. 1, in more detail. The apparatus 100 optionally further comprises a removing means 251 for removing at least some unfused particles of the deposited first material, as described above. The apparatus 100 optionally further comprises a second fusing means 252 for fusing at least some of the particles of the second material, as described above. The apparatus 100 optionally further comprises a heating means 253 for pre-heating the deposited first material or post-heating the formed first part of the layer of the article, as described above. The apparatus 100 optionally further comprises machining means 254 for machining the formed first part of the layer of the article, as described above. The apparatus 100 optionally further comprises a layer reusing means 255 for providing a part of the second material from another support layer, as described above. The apparatus 100 optionally further comprises a process chamber 256 in which the additive manufacturing process is performed, as described above. The apparatus 100 optionally further comprises a controller 257 arranged to control the apparatus 100, as described above. The apparatus 100 optionally further comprises 258, as described above.

Figure 3:
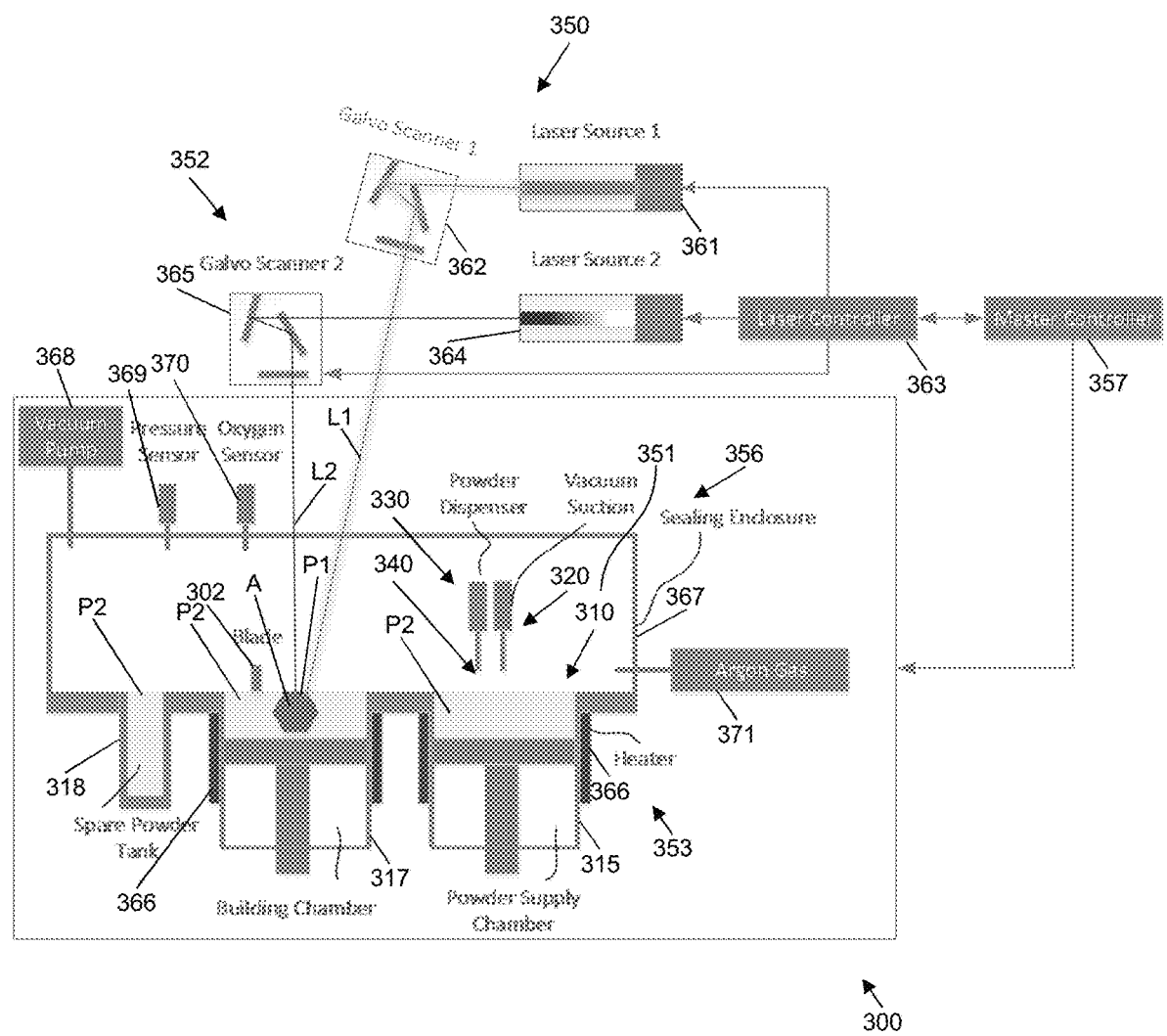
FIG. 3 schematically depicts another apparatus according to an exemplary embodiment of the invention.

FIG. 3 schematically depicts another apparatus 300 according to an exemplary embodiment of the invention. Like reference signs refer to similar features, as described with respect to FIGS. 1 and 2. The apparatus 300 is for additive manufacturing of a part of an article A from a first material P1 comprising particles having a first composition, according to an exemplary embodiment of the invention. Particularly, the apparatus 300 comprises a layer providing means 310 for providing a first support layer from a second material P2 comprising particles having a second composition, wherein the first composition and the second composition are different, a concavity defining means 320 for defining a first concavity in an exposed surface of the first support layer, a depositing means 330 for depositing a part of the first material in the first concavity defined in the first support layer, a levelling means 340 for selectively levelling the deposited first material in the first concavity, and a first fusing means 350 for fusing some of the particles of the levelled first material in the first concavity by at least partially melting said particles, thereby forming a first part of the layer of the article. The layer providing means 310 comprises a powder supply chamber 315, a build chamber 317 and a blade 302, as described above. The powder supply chamber 315 and the build chamber 317 comprise retractable beds, as described above. The layer providing means 310 further comprises a spare powder chamber 318. The layer providing means 310 is described in more detail below with reference to FIG. 4. The concavity defining means 320 is described in more detail below with reference to FIGS. 5 to 7. The concavity defining means 320 is mounted on a X-Y stage, having a Z axis stage, providing movement in three orthogonal directions. The depositing means 330 is described in more detail below with reference to FIGS. 8 to 10. The depositing means 330 is mounted on a X-Y stage, having a Z axis stage, providing movement in three orthogonal directions. The levelling means 340 is described in more detail below with reference to FIGS. 8 to 10. The levelling means 340 is coupled to the depositing means 330, mounted on the X-Y stage, having the Z axis stage, providing movement in three orthogonal directions. The first fusing means 350 comprises a first laser source 361, a first x-y or x-y-z galvo scanner 362 and a laser controller 363. The first laser source 361 may provide a first laser beam L1 having spot size between 10 μm and 200 μm. Suitable laser sources are known in the art. The apparatus 300 further comprises a controller 357 arranged to control the apparatus 300, as described above. The apparatus 300 comprises a removing means 351 for removing at least some unfused particles of the deposited first material, provided by the concavity defining means 320. The apparatus 100 further comprises a second fusing means 352 for fusing at least some of the particles of the second material. The second fusing means 352 comprises a second laser source 364, a second x-y or x-y-z galvo scanner 365 and the laser controller 363. The second laser source 362 may provide second laser beam L2 a spot size between 2 mm and 20 mm. The second laser source 362 is arranged to control thermal gradients and cooling rates for processing materials such as ceramics and alloys to prevent cracking. Suitable laser sources are known in the art. The first fusing means 350 and the second fusing means 352 are arranged such that laser beams L1 and L2 provided by their respective laser sources are not co-axial i.e. off-axis. The first fusing means 350 and the second fusing means 352 are controlled by the controller 357 and synchronised via a handshake mechanism. The second laser beam L2 from the second fusing means 352 is defocused, with the purpose of thermal management to control the thermal gradient and residual stresses. This is useful for melting ceramics (high melting point) or very thin metals, in which distortion may be problematic. The second laser beam L2 may not be on the same spot and can be separated from the main fusion laser beam from the first fusing means 350. The second laser beam L2 does not melt the materials, but heats up the material to manage the thermal distributions over the entire article to balance the heat to reduce distortions and thermal stresses. The apparatus 100 further comprises a heating means 353 for pre-heating the deposited first material or post-heating the formed first part of the layer of the article. The heating means 353 comprises the second fusing means 352 and a heater 366. The apparatus 300 further comprises a layer reusing means (not shown) for providing a part of the second material from another support layer. The apparatus 300 further comprises a process chamber 356 in which the additive manufacturing process is performed, as described above. The process chamber 356 comprises a sealable enclosure 367, a vacuum pump 368, a pressure sensor 369, an oxygen sensor 370 and an argon gas supply 371.

Figure 4A:
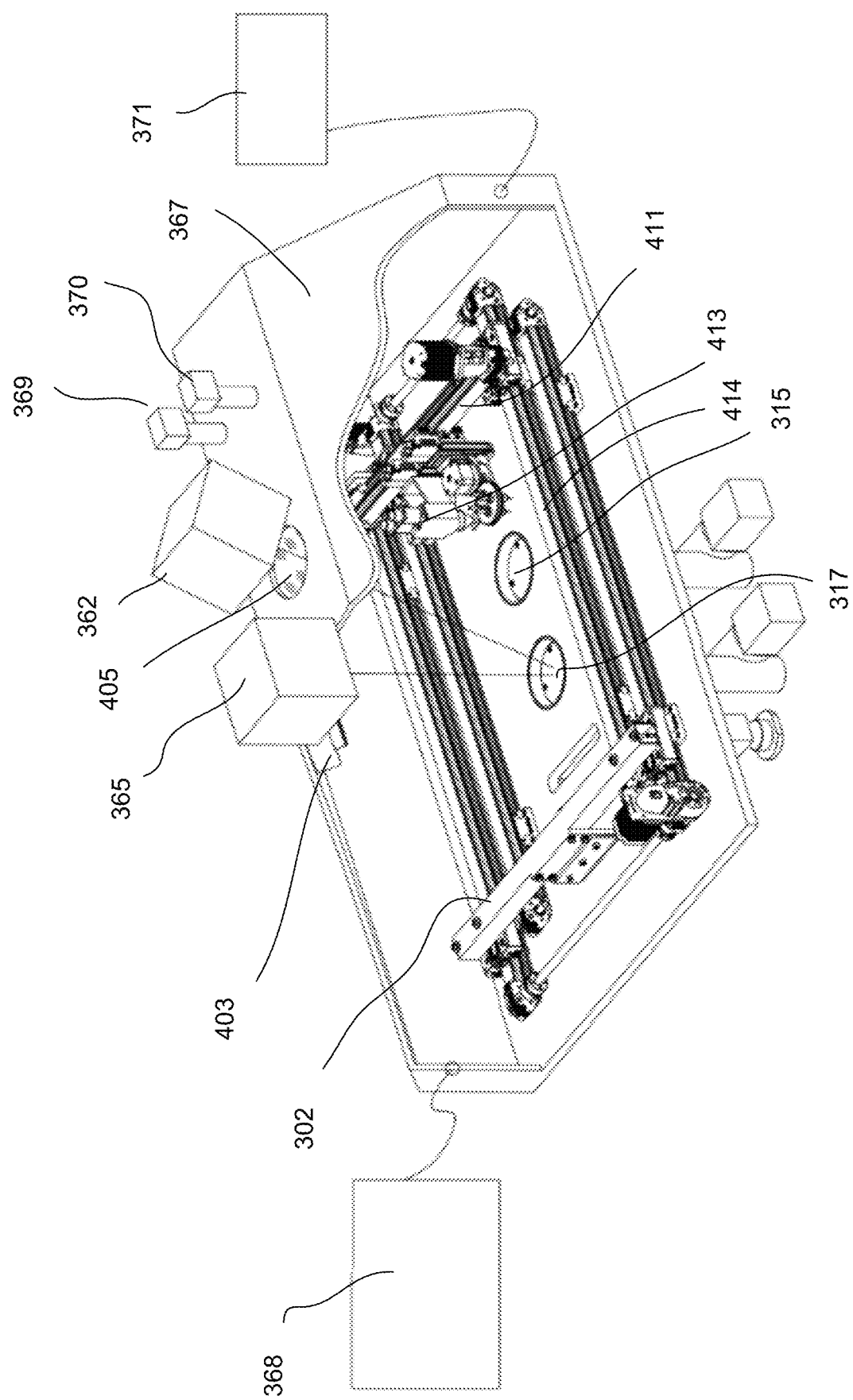
Figure 4B:
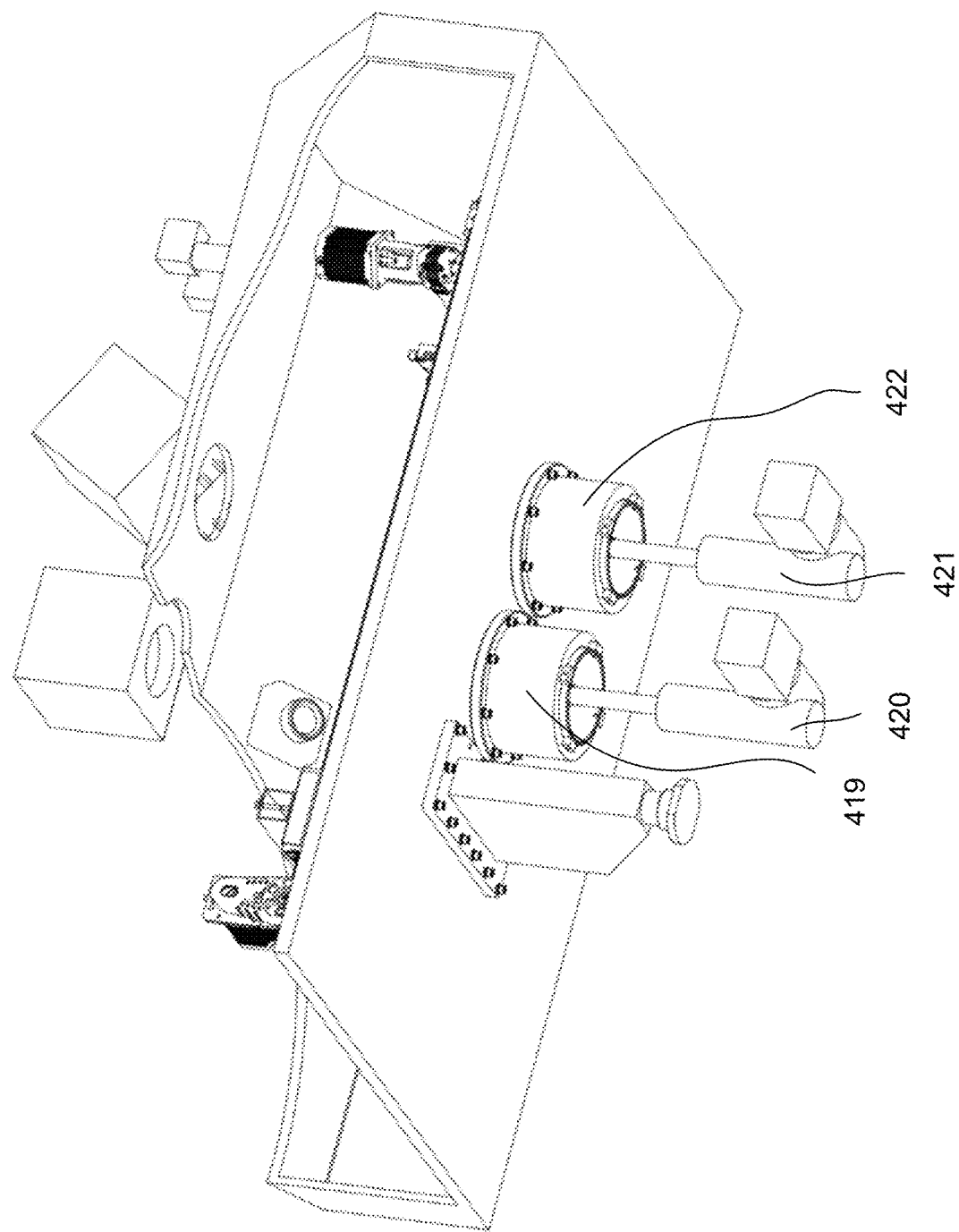

FIGS. 4A to 4C schematically depict parts of the apparatus 300 according to FIG. 3, in more detail. FIG. 4A is a cutaway isometric view of the apparatus 300, from above. FIG. 4B is a cutaway isometric view of the apparatus 300, from below. FIG. 4C is a partial isometric view of the apparatus 300, from above. The layer providing means 310 (also known as a support powder delivery system) is arranged to spread the second material (the support material), provided as a powder. The powder is supplied from the storage chamber 315 and is spread and levelled with the blade 302, driven by a motion controlled linear stage 316, thereby providing a first layer having a thickness in a range 50 μm to 200 μm on an exposed surface of the retractable bed of the building chamber 317. Unused powder is collected in the spare powder gathering chamber 318. Two pistons in the chambers 315 and 317, driven by screw gearing lifts 420 and 421 respectively, move up or down during the processing, as required. Plate electrically heated conduction heaters 419 and 432, mounted outside the chambers 315 and 317, are employed to preheat the first material and maintain the part temperature, to reduce thermal gradients. The concavity defining means 320 is mounted on the X-Y stage 411, 414, having a Z axis stage 424, providing movement in three orthogonal directions. The depositing means 330 is mounted on the X-Y stage 411, 414, having a Z axis stage 423, providing movement in three orthogonal directions.

Figure 5:
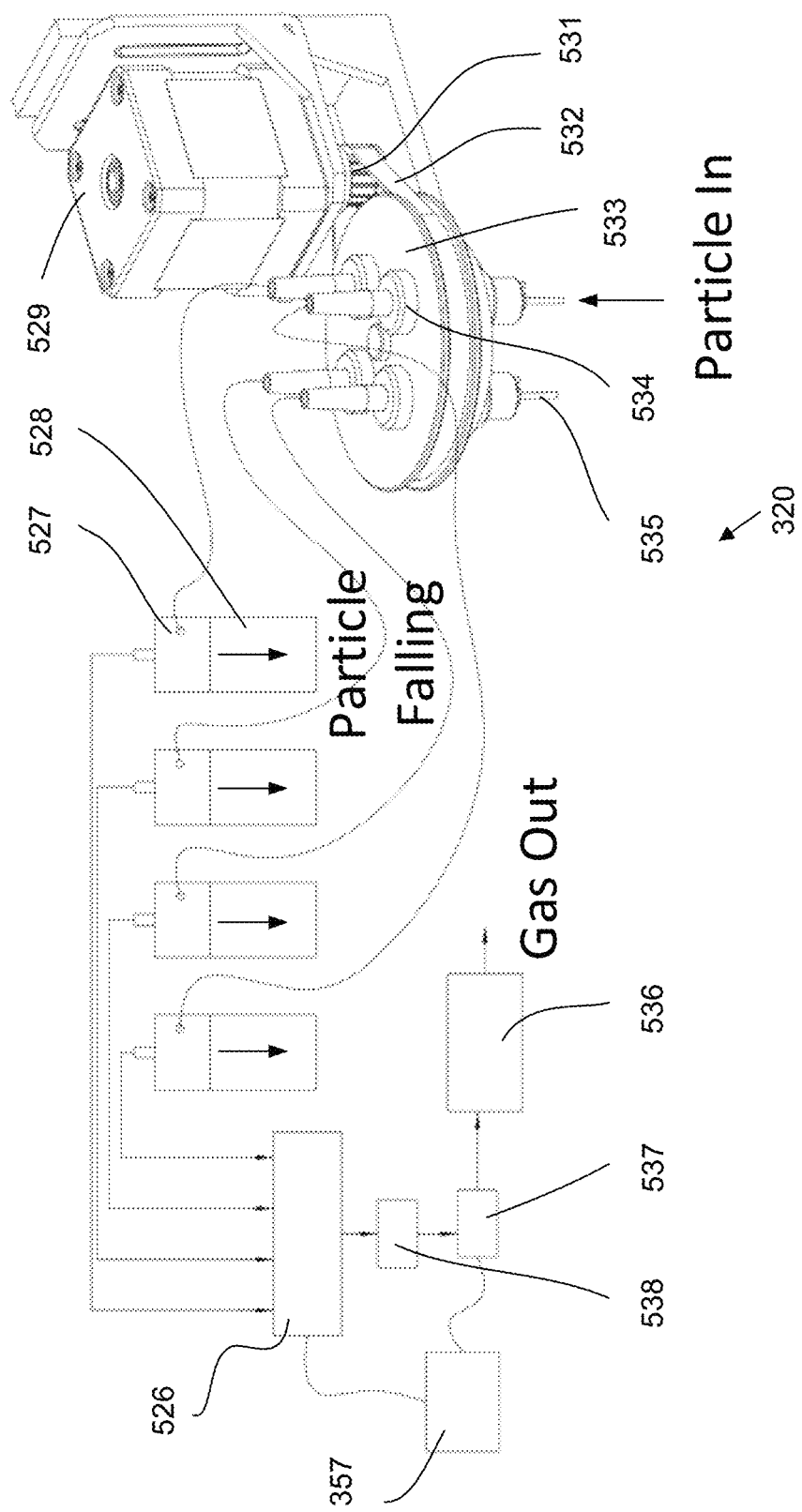
FIG. 5 schematically depicts part of the apparatus according to FIG. 3, in more detail.
Figure 6:
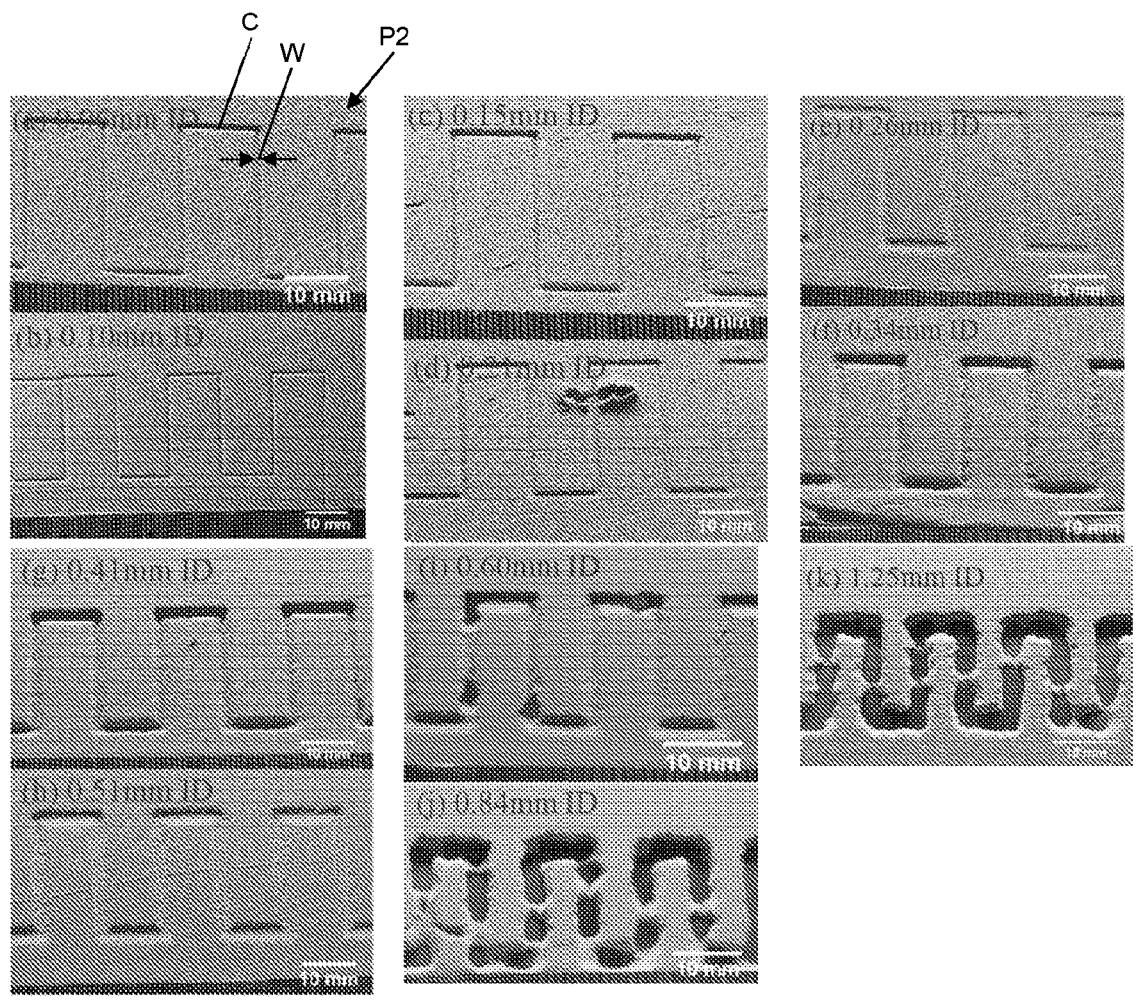
FIGS. 6A to 6K depict optical photographs of concavities defined by the apparatus according to FIG. 3.

FIG. 5 schematically depict parts of the apparatus according to FIG. 3, in more detail. Particularly, FIG. 5 schematically depicts the concavity defining means 320, in more detail. As depicted in FIG. 5, a set of four adapter tubes 534 are mounted on a rotation disk 533, driven by a stepper motor 529 turning through a synchronous pulley 531 and a synchronous belt 532. Vacuum nozzles (also known as suction needles) 535 having different geometries are inserted in each of the adapter tubes 534 respectively. The stepper motor 529 turns the rotation disk 533 a given angle according to a pulse signal sent by the controller 357 and positions the required suction needle 535 in a desired position. Air flow created by a micro vacuum pump 536, based on, for example, cyclone bagless vacuum dust removal principle, remove particles on the powder bed. Due to a geometric design of an 'air-particle' separator 527, a vortex is generated and the particles are collected into four particle tanks 528, fixed on the bottom of the separators 527. Each vacuum nozzle 535 is separately fluidically coupled to a different particle tank 528, such that different materials may be isolated in different particle tanks 528. In this way, contamination between materials may be reduced, allowing reuse or recycling of the collected materials. The 'air-particle' separators are linked with a solenoid operated N-way valve 526. Hence only one way of the vacuum suction channel can work according to the signal sent by the controller 357. The air flow rate is controlled by a flow valve 537. A filter 538 is inserted in the pipeline for protecting the flow valve 537 and the micro vacuum pump 536. The vacuum nozzle 535 and gas pressure (i.e. gas flow rate) are designed in such a way that only one layer of support material is removed at particular locations i.e. such that the depth of the first concavity is at most and/or one layer. These parameters may depend on the type of support materials. In use, the end of the vacuum nozzle 535 is maintained at a height of 1.0 mm above the exposed surface of the particles to be removed. After the part of the first material is deposited in the first concavity and some of the particles fused therein, a machine vision camera 403 mounted on the wall of the enclosure 367 is detects unfused first powder or cross contamination on the exposed surface. The collected image is compared with a theoretically sliced cross section of a 3D model and surplus first material and/or contaminants are identified. The concavity defining means 320 is arranged to removes such surplus first material or contaminants from the exposed surface.

FIGS. 6A to 6K depict optical photographs of concavities C defined by the concavity defining means 320. Particularly, FIGS. 6A to 6K depict optical photographs of concavities defined by the concavity defining means 320 traversing from left to right boustrophedonically according to a square wave pattern. The first layer, having an uniform thickness of approximately 100 μm, comprises a second material P2 copper particles having a mean diameter of 38 μm. An internal diameter of the vacuum nozzle 535 was varied, from 0.06 mm to 1.25 mm, as detailed below. FIGS. 6A to 6K relate to internal diameters of the vacuum nozzle 535 of 0.06 mm, 0.10 mm, 0.15 mm, 0.21 mm 0.26 mm, 0.34 mm, 0.41 mm, 0.51 mm, 0.60 mm, 0.84 mm and 1.25 mm respectively, as detailed below in Table 1.

TABLE 1

Vacuum nozzle internal diameter, outside diameter and length.

| Needle ID (mm) | Needle OD (mm) | Needle Length (mm) |
|---|---|---|
| 0.06 | 0.23 | 6.00 |
| 0.10 | 0.23 | 6.00 |
| 0.15 | 0.30 | 6.00 |
| 0.21 | 0.41 | 13.00 |
| 0.26 | 0.51 | 13.00 |
| 0.34 | 0.64 | 13.00 |
| 0.41 | 0.72 | 13.00 |
| 0.51 | 0.82 | 13.00 |
| 0.60 | 0.91 | 13.00 |
| 0.84 | 1.27 | 13.00 |
| 1.25 | 1.60 | 13.00 |

FIGS. 6A to 6K depict that as the internal diameter of the vacuum nozzle 535 increases, a width W of the defined concavity generally increases. However, above an internal diameter of 0.51 mm (i.e. 0.60 mm, 0.84 mm and 1.25 mm), the width W and/or depth D of the defined concavity becomes unstable. In contrast, for internal diameters in the range 0.06 mm to 0.51 mm, the width D of the defined concavity appears constant. Table 2 summarises results of measured width W of the defined concavity for the vacuum nozzle 535 having the different internal diameters. The mean width W and standard deviation thereof increases as the vacuum nozzle internal diameter increases. Without wishing to be bound by any theory, the mean width W is approximately 1.5 times greater than the outside diameter of the vacuum nozzle. Hence, when designing tool paths, hatch distances 1.5 times smaller than the vacuum nozzle outside diameter should be used, so as to result in areas of vacuum overlap between adjacent defined cavities.

TABLE 2

Defined concavity width W for different internal diameters.

| ID mm | OD mm | Width P1 mm | Width P2 mm | Width P3 mm | Width Mean mm | Standard Deviation mm |
|---|---|---|---|---|---|---|
| 0.06 | 0.23 | 0.43 | 0.42 | 0.44 | 0.43 | 0.01 |
| 0.1 | 0.23 | 0.53 | 0.42 | 0.51 | 0.49 | 0.059 |
| 0.15 | 0.30 | 0.60 | 0.62 | 0.6 | 0.61 | 0.012 |
| 0.21 | 0.41 | 0.71 | 0.74 | 0.76 | 0.74 | 0.025 |
| 0.26 | 0.51 | 1.01 | 0.97 | 1.06 | 1.00 | 0.045 |
| 0.34 | 0.64 | 1.37 | 1.34 | 1.26 | 1.30 | 0.057 |
| 0.41 | 0.72 | 0.98 | 0.93 | 1.03 | 0.98 | 0.05 |
| 0.51 | 0.82 | 1.77 | 1.54 | 1.67 | 1.70 | 0.12 |
| 0.6 | 0.91 | 1.40 | 1.59 | 1.4 | 1.50 | 0.11 |
| 0.84 | 1.27 | 2.52 | 2.42 | 2.53 | 2.50 | 0.061 |
| 1.25 | 1.60 | 2.6 | 2.96 | 2.69 | 2.80 | 0.19 |

Figure 7A:
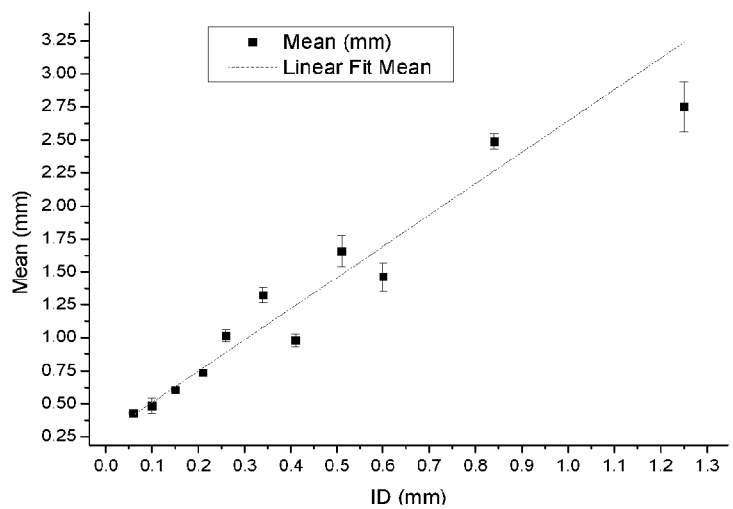
FIGS. 7A to 7C depict graphs of results for the concavities according to FIGS. 6A to 6K.
Figure 7B:
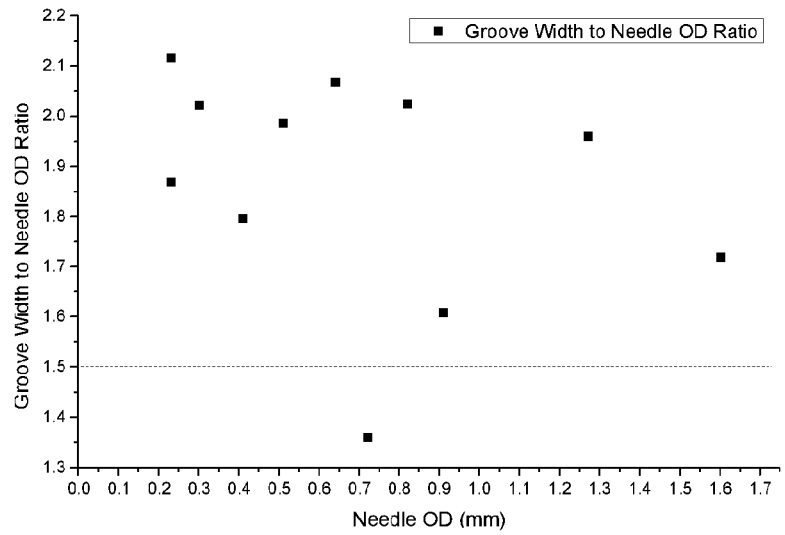
Figure 7C:
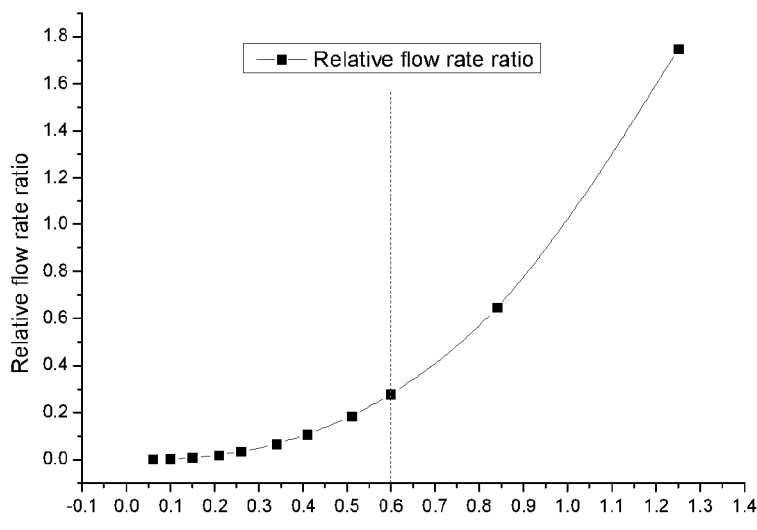

FIGS. 7A to 7C depict graphs of results for the concavities according to FIGS. 6A to 6K. FIG. 7A depicts a graph of mean width W of the defined concavity plotted against the internal diameter of the vacuum nozzle. The mean width W is directly proportional to the internal diameter of the vacuum nozzle, for internal diameters in the range from 0.06 mm to 1.25 mm. FIG. 7B depicts a graph of mean width W of the defined concavity plotted against the outside diameter of the vacuum nozzle. The mean width W is constant as a function of the outside diameter of the vacuum nozzle, for external diameters in the range from 0.23 mm to 1.60 mm. FIG. 7C depicts a graph of calculated relative flow rate ratio plotted against the internal diameter of the vacuum nozzle. The relative flow rate ratio is determined according to the general compressible flow equation (Pocketengineer 2015):

$$Q = \sqrt{\frac{(P_1^2 - P_2^2)d^5}{25.2LTf}}$$

where Q is flow rate, d is the pipe internal diameter, $P_1$ is upstream pressure, $P_2$ is downstream pressure, L is pipe length, T is average pipeline temperature, and f is the Moody friction factor. As depicted in FIG. 7C, the relative flow rate ratio increases exponentially as a function of the internal diameter of the vacuum nozzle. Furthermore, the relative flow rate ratio increases significantly above an internal diameter of 0.60 mm. According to the Schematic model of initiation of particle movement by wind (W. G. Nicklin, 1988), there is critical shear velocity for the sand or dust to take off and join air flow/wind. As described above, above the internal diameter of 0.51 mm (i.e. 0.60 mm, 0.84 mm and 1.25 mm), the width W and/or the depth D of the defined concavity becomes unstable, in agreement with this model. Hence, internal diameters smaller than 0.60 mm should be used, so as to maintain particle removal accuracy.

Figure 8A:
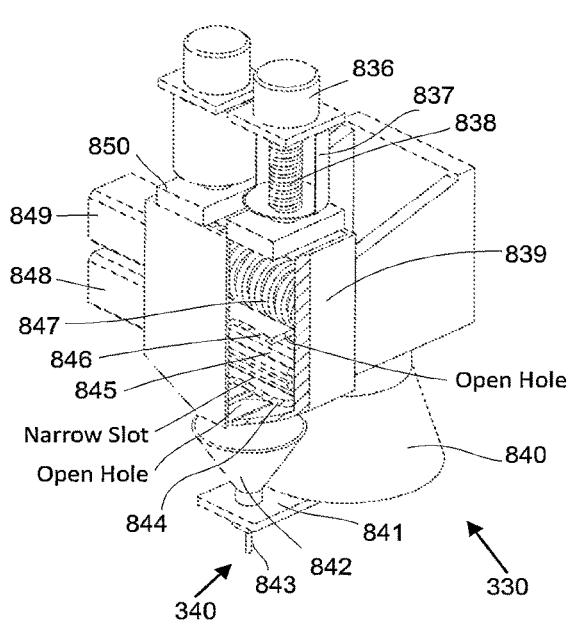
FIGS. 8A to 8D schematically depict parts of the apparatus according to FIG. 3, in more detail.
Figure 8B:
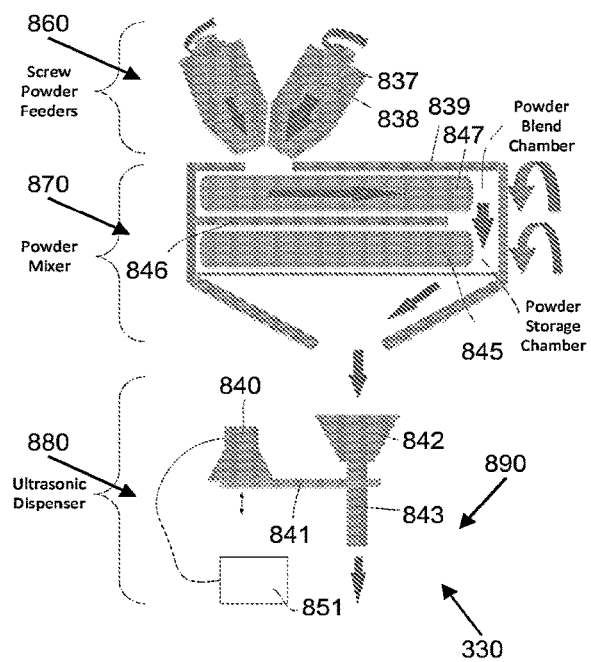
Figure 8C:
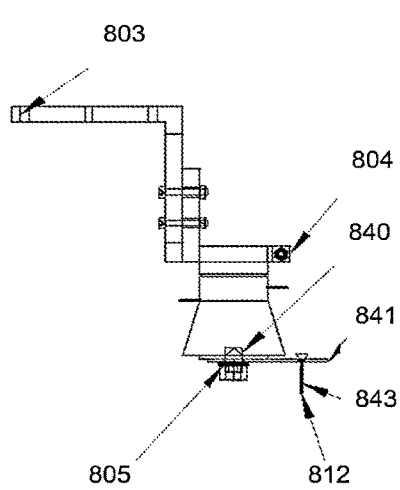
Figure 8D:
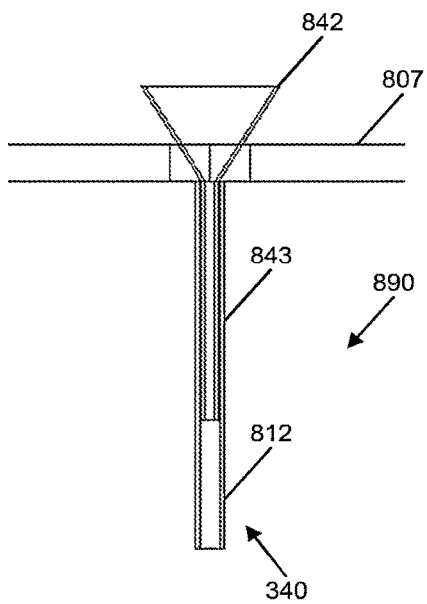

FIGS. 8A to 8D schematically depict parts of the apparatus 300 according to FIG. 3, in more detail. Particularly, FIGS. 8A to 8D depict the depositing means 330 in more detail. FIG. 8A is a cutaway isometric view of the depositing means 330 and the levelling means 340, which may be referred to as a print head. FIG. 8B is a schematic of the depositing means 330, in use. The depositing means 330 comprises a material feeder 860, a material mixer 870, a material depositor 880 and a deposition nozzle 890. The depositing means 330 and the levelling means 340 coupled thereto, are moveable on the X-Y moving system or gantry, so that the part of the first material may be deposited in the first concavity defined in the first support layer. The material feeder 860 comprises two screw powder feeders 837, each having a spiral shaft 838. The material mixer 870 comprises a powder mixer 839 having a cross wall 846 that divides the powder mixer 839 in two parts, a powder blend chamber and a powder mixture storage chamber, a screw shaft 845 in the powder blend chamber and a slot shaft 845 in the powder mixture storage chamber. The material depositor 880 comprises a vibration-based depositor, comprising a piezoelectric transducer (PZT) 840, a coupling member 841, a hopper 842, a deposition nozzle 843, and a ultrasonic frequency generator 851. The piezoelectric transducer 840 is coupled to the ultrasonic vibration generator 851. A high frequency AC voltage output by the ultrasonic frequency generator 851 induces vibration of the coupling member 841 and the deposition nozzle 843. Wave characteristics of the ultrasonic vibration control, at least in part, a flow rate and a switching of powder flow. The deposition nozzle 890 is coupled to the levelling means 340, providing a deposition/scraping nozzle 843, arranged to simultaneously deposit the first material and locally scrape the first material, as described below. As shown in FIG. 8B, multiple powder materials are stored in the two screw powder feeders 837 respectively. The spiral shafts 838 in the powder feeders 837 are driven by stepper motors 836. A certain dose of powder drops out from the screw slots of the spiral shaft 838 and falls into the powder mixer 839, due to rotation of the spiral shaft 838, in use. A total weight of each screw powder feeder 837 is measured by precision load sensors 850 mounted on the bottom of each of the powder feeders 837 and is sent to the controller 357 on real time. The controller 357 compares this weight with a predetermined setting value and issues a stop command to the stepper motors 836 if a corresponding weight threshold value is exceeded. In this way, a powder mixture composition can be programmed accurately, allowing articles to be built from functionally-graded materials. The cross wall 846 divides the powder mixer 839 into 2 parts, i.e. powder blend chamber and powder mixture storage chamber. All particles are carried from left side to the right side of the chamber by the screw shaft 847 turning, during which all materials are blended sufficiently. A group of uniformly distributed slots are machined on surface of the shaft 845 along its axis. Rotation of this slot shaft 845 controls particle flow on or off. The shafts 845 and 846 are driven by two stepper motors 848 and 849 respectively. FIG. 8C is a cross-sectional view of the material depositor 880, in more detail. The material depositor 880 further comprises a first slotted bracket 803 coupled slidably to a second bracket 804 such that a height of the ultrasonic dispenser may be adjusted, a rubber washer 805 arranged to thermal insulate the PZT 840 from the coupling member 841 arranged to couple the PZT 840 to the deposition nozzle 843. The coupling member 841 is made by metal and thin to improve vibration transfer. The tubular deposition nozzle 843 includes the hopper 842, to receive the first material from the powder mixer 870, at a first end thereof. The levelling means 340 comprises the outer cylinder sleeve 812 coupled at a second end of the deposition nozzle 843. The cylinder sleeve 812 is arranged to control, in part, deposition of the first material by reducing a track width, controlling height and/or controlling cross-sectional shape, such as a trapezoidal shape, of the deposited first material. A ratio between a diameter of an orifice of the deposition nozzle 843 and a particle size, for example of the first particles, is generally from 5 to 10 in order to get a more constant flowrate of the first material. The material depositor 880 is coupled to a slip block of the gantry Y-axis by the first bracket 803. Two M4 screws and nuts are used to couple brackets 803 and 804, so that a height of the PZT 840 can be adjusted. The PZT 840 is coupled to the bracket 804, having its positive and negative electrodes at a middle and a bottom of the piezoelectric ring link to ultrasonic vibration generator. The PZT 840, the rubber washer 805, and the coupling member 807 are coupled by a M10 screw, M10 nut and a lock washer. Vibration can be transferred from the PZT 840 to the deposition nozzle 843 by the metal bracket 807. The inner diameter of the deposition nozzle 843 is typically determined by a powder size, which is generally 0.2 mm to 0.5 mm. In this way, the width of a track of the deposited first material is constant and the track cross section is trapezoidal. FIG. 8D is a cross-sectional view of the deposition nozzle 843. The tubular deposition nozzle 843 includes the hopper 842, to receive the first material from the powder mixer 870, at the first end thereof. The levelling means 340 comprises the outer cylinder sleeve 812 coupled at the second end of the deposition nozzle 843. The cylinder sleeve 812 is arranged to control, in part, deposition of the first material by reducing a track width, controlling height and/or controlling cross-sectional shape, such as a trapezoidal shape, of the deposited first material. The deposition nozzle 843 has a selectable internal diameter (i.e. orifice diameter), in a range 0.2 mm to 0.5 mm. The cylinder sleeve 812 has an internal diameter of 0.7 mm. The cylinder sleeve 812 extends beyond the second end of the deposition nozzle 843 by a distance of 0.5 mm, so as to control, in part, deposition of the first material by reducing a track width, controlling height and/or controlling cross-sectional shape, such as a trapezoidal shape, of the deposited first material. Particularly, the cylinder sleeve 812 behaves as a scraper, whereby the deposition nozzle 843 is arranged to simultaneously deposit the first material and locally scrape the first material. In contrast, scraping of the deposited first material with the conventional blade 302 may cross-contaminate the first material and second material and/or may result in a non-uniform thickness of the deposited first material, such as local voids.

Figure 9A:
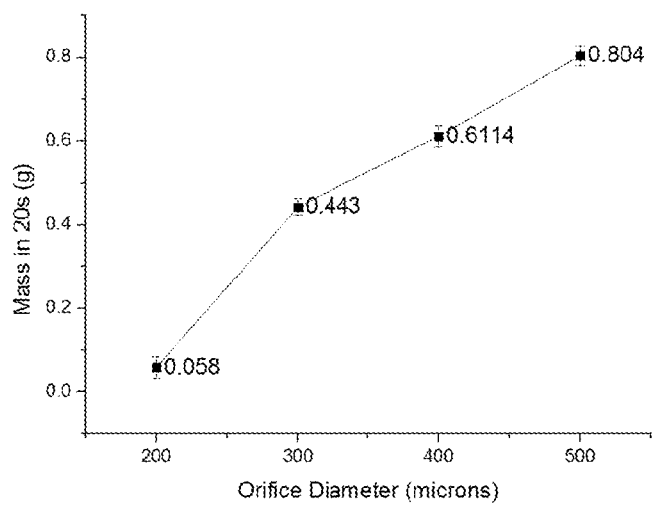
FIGS. 9A to 9C depict graphs of results of first material deposited by the apparatus according to FIG. 3.
Figure 9B:
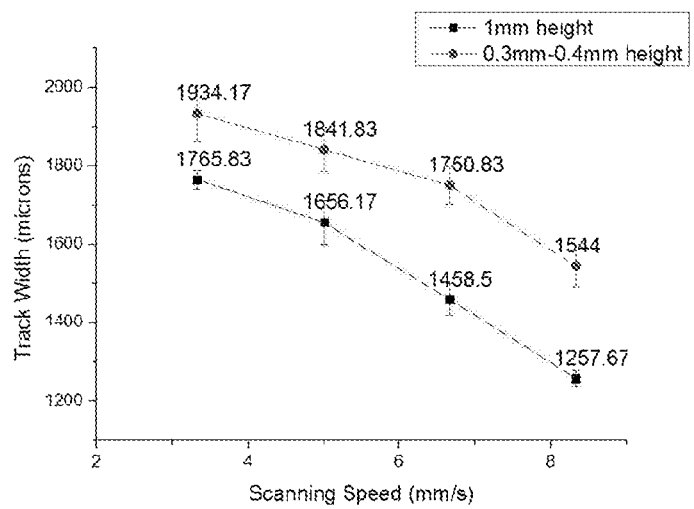
Figure 9C:
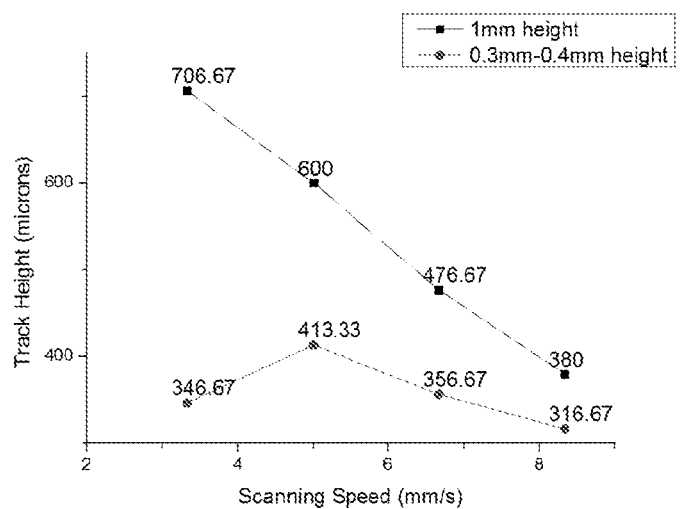

FIGS. 9A to 9C depict graphs of results for first material deposited by the apparatus according to FIG. 3. FIG. 9A depicts a graph of mass of a first powder deposited as tracks on a planar surface in a time period of 20 seconds (i.e. flowrate) versus orifice diameter of the deposition nozzle 843, for orifice diameters of 200 μm, 300 μm, 400 μm and 500 μm. The first material comprises particles of dry copper, having a mean diameter of 38 μm. PZT parameters are 60 W at 28 kHz. For orifice diameters greater than 200 μm, flowrates are directly proportional to orifice diameter and stable flowrates are observed. However, for the orifice diameter of 200 μm, the flowrate is not stable. Thus, an orifice diameter of greater than 200 μm is preferred, for example, for particles having a mean diameter of 38 μm. A ratio between the orifice diameter and a particle size, for example of the first particles, is generally from 5 to 10 in order to get a more stable flowrate of the first material. FIG. 9B depicts a graph of track width versus scanning speed for an orifice diameter of 0.4 mm (400 μm), for two different heights H (1 mm and between 0.3 mm and 0.4 mm) of the deposition nozzle 843 above a planar surface. Results for four different scanning speeds are depicted, 3.33 mm/s, 5 mm/s, 6.67 mm/s and 8.33 mm/s, respectively. The track width obtained for the height H of 1 mm is lower than that of the lower height at the same speed. For the same height H, track widths decrease with an increase in scanning speed. FIG. 9C depicts a graph of track height versus scanning speed for an orifice diameter of 0.4 mm (400 μm), for two different heights H (1 mm and between 0.3 mm and 0.4 mm) of the deposition nozzle 843 above a planar surface. Results for four different scanning speeds are depicted, 3.33 mm/s, 5 mm/s, 6.67 mm/s and 8.33 mm/s, respectively. Even though the track width at the height H of 1 mm is lower compared with the lower height H, the corresponding track height is high and equal to the layer thickness (???). In contrast, the track height at the lower height H of between 0.3 mm to 0.4 mm is relatively constant as a function of scanning speed and it is nearly equal to the height H.

FIGS. 10A to 10D depict results of material deposited by the apparatus according to FIG. 3. FIGS. 10A and 10B depict plan views (I & ii) and cross-sectional profiles (iii) of tracks deposited at the two heights H of 1 mm and between 0.3 mm and 0.4 mm, respectively. For the height H of 1 mm, the track has a triangular profile and powder is scattered at the track edge. For the height H of between 0.3 mm and 0.4 mm, the track has a trapezoidal profile and track edge quality is improved. Without wishing to be bound by any theory, a trapezoidal cross-sectional profile preferred for depositing the part of the first material in the first concavity. FIG. 10C schematically depicts a method of measuring track width and track height as a function of height H. Particularly, the first material is deposited on an inclined planar surface, such that the height H varies linearly from between 0.5 mm and 0.6 mm (i.e. about 0.55 mm) to between 0.1 mm and 0.2 mm (i.e. about 0.15 mm). Scanning speed was 3.33 mm/s, 5 mm/s, 6.67 mm/s and 8.33 mm/s for different tracks. FIG. 10D shows a plan view of an image of 5 tracks deposited according to the method described with respect to FIG. 100. For different scanning speeds, the range of height which leads to trapezoidal cross-sectional profile is less than 0.48 mm for 3.33 mm/s, 0.33 mm for 5 mm/s, 0.3 mm for 6.67 mm/s, and 0.25 mm for 8.33 mm/s, respectively. Therefore, for a particular speed, when the height H is about 0.3 mm, the track width and the cross-sectional shape are stable.

Figure 11:
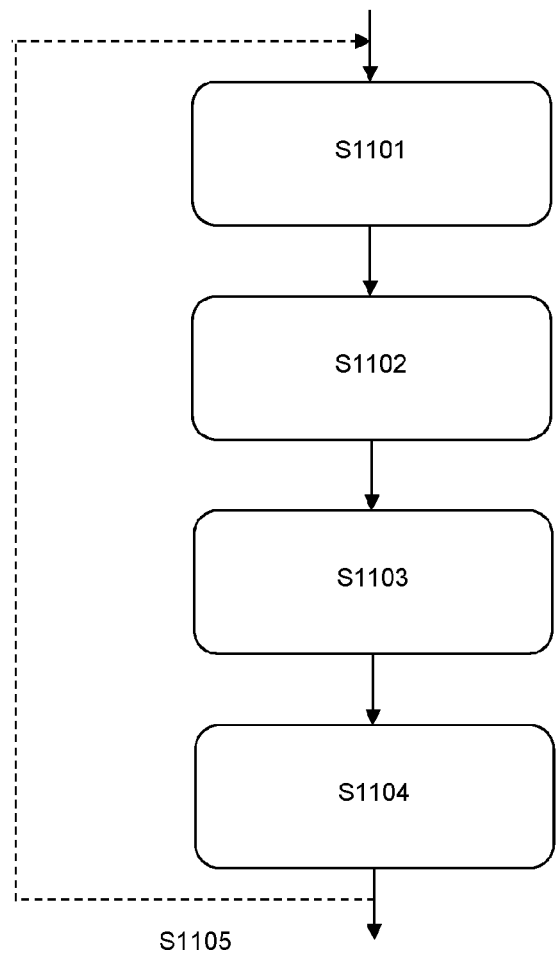
FIG. 11 schematically depicts a process of additive manufacturing according to an exemplary embodiment of the invention.

FIG. 11 schematically depicts a process of additive manufacturing according to an exemplary embodiment of the invention. The process of additive manufacturing is of a part of an article from a first material comprising particles having a first composition (i.e. a build material). At S1101, a first support layer from a second material comprising particles having a second composition (i.e. a support material) is provided, wherein the first composition and the second composition are different. At S1102, a first concavity is defined in an exposed surface of the first support layer. At S1103, a part of the first material is deposited in the first concavity defined in the first support layer. At S1104, at least some of the particles of the deposited first material are fused by at least partially melting said particles, thereby forming a first part of a layer of the article. Optionally, at S1105, one or more of steps S1101 to S1104 are repeated.

Figure 12:
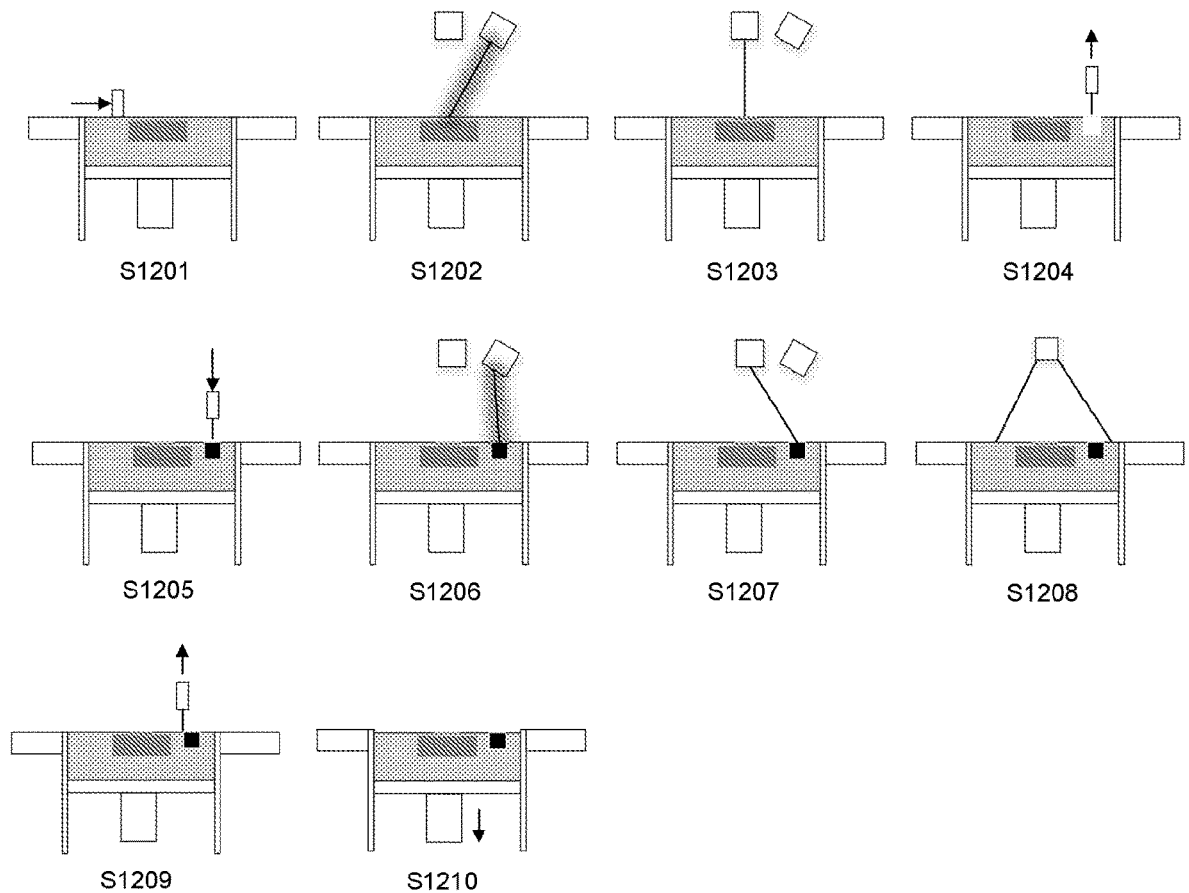
FIG. 12 schematically depicts the process of additive manufacturing according to FIG. 11, in more detail.

FIG. 12 schematically depicts the process of additive manufacturing according to FIG. 11, in more detail. At S1201, the first support layer from the second material comprising particles having the second composition is provided, for example, using a scraper according to a conventional SLM process. Optionally, at S1202, at least some of the second particles are preheated by a first laser beam. Optionally, at S1203, at least some of the second particles are sintered or melted by a second laser beam. At S1204, a first concavity is defined in the exposed surface of the first support layer, by removing second particles according to a predetermined pattern to a depth of the first support layer. At S1205, the part of the first material is deposited in the first concavity defined in the first support layer, for example by ultrasonic vibration dispensers or pressure pulse assisted dispensers. Optionally, at S1206, at least some of the first particles are preheated by the first laser beam. At S1207, at least some of the particles of the deposited first material are fused by the second laser beam by at least partially melting said particles, thereby forming the first part of the layer of the article. Optionally, at S1208, unfused first particles are detected, for example, by comparing an image of the exposed surface of the layer and a corresponding layer of a 3D model of the article. Optionally, at S1209 such detected unfused first particles are removed. Optionally, at S1210, the part building platform moves down by one layer thickness. Optionally, one or more of steps S1201 to S1210 are repeated.

Figure 13:
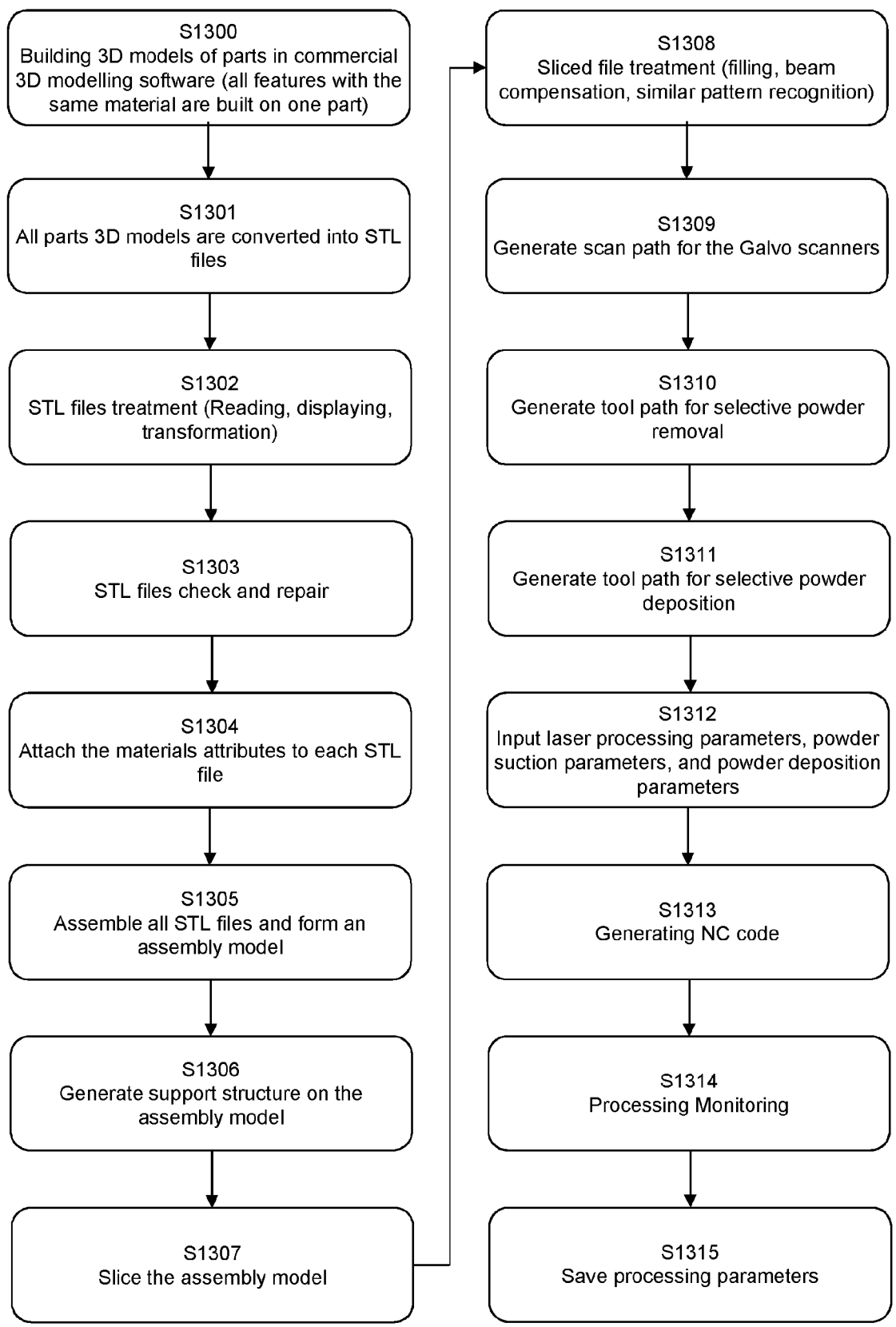
FIG. 13 schematically depicts a part of the process of additive manufacturing according to FIG. 11, in more detail.

FIG. 13 schematically depicts a part of the process of additive manufacturing according to FIG. 11, in more detail. At S1300, a 3D model is built, the 3D model comprising parts. At S1301, the 3D model parts are converted into STL files. At S1302, the STL files are treated by reading, displaying and/or transformation. At S1303, the STL files are checked and/or repaired. At S1304, material attributes are attached to each STL file. At S1305, all STL files are assembled to form an assembly model. At S1306, a support structure on the assembly model is generated. At S1307, the assembly model is sliced. At S1308, the sliced files are treated by filling, beam compensation and/or similar pattern recognition. At S1309, scan paths for the galvo scanners are generated. At S1310, tool paths for selective powder removal are generated. At S1311, tool paths for selective powder deposition are generated. At S1312, laser input parameters, powder suction parameters and/or powder deposition parameters are input. At S1313, NC code is generated. At S1314, the process is monitored. At S1315, the processing parameters are saved.

Experimental Materials and Procedure
Materials

Gas atomized spherical 316L stainless steel powder (LPW-718-AACF, 10-45 μm, LPW Technology Ltd., UK), In718 nickel alloy powder (LPW-316-AAHH, 10-45 μm LPW Technology Ltd., UK), and Cu10Sn copper-alloy spherical powder of 10-45 μm diameters (Makin Metal Powders Ltd. UK) were used in this investigation. The ground finished 304 steel substrate plates had dimensions of 120 mm diameter and 12 mm thickness. The material chemical compositions are presented in Table 3.

TABLE 3

Chemical compositions of powders and the substrate use in this investigation

| Material | | 316L | In718 | Cu10Sn | 304 |
| --- | --- | --- | --- | --- | --- |
| Chemical | Ni | 10.5 | 52.5 | 3 | 2.0 |
| Compositions | Fe | 69.85 | 18.58 | 0.3 | 66.345-74 |
| (wt. %) | Cr | 16.6 | 19.1 | — | 18-20 |
| | Nb + Ta | — | 5.04 | — | — |
| | Mo | 2.2 | 2.95 | — | — |
| | Ti | — | 0.91 | — | — |
| | Al | — | 0.58 | — | — |
| | Mn | — | 0.05 | — | — |
| | Si | 0.8 | 0.13 | — | 1.0 |
| | C | 0.03 | 0.03 | — | 0.08 |
| | P | 0.02 | 0.004 | — | 0.045 |
| | S | 0.01 | 0.001 | — | 0.03 |
| | Sn | — | — | 10 | — |
| | Pb | — | — | 2 | — |

Experiment Setup

Figure 14:
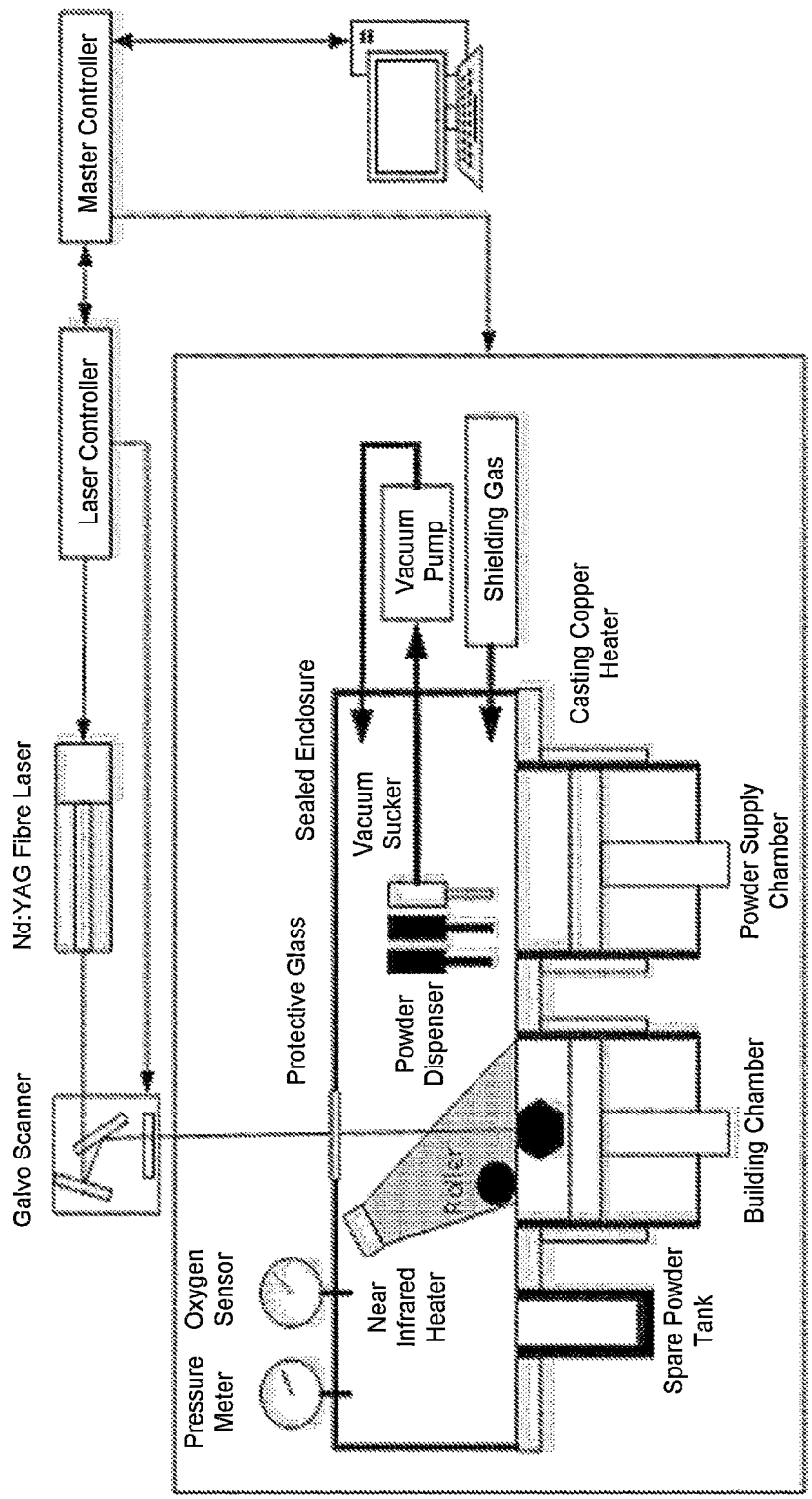
FIG. 14 schematically depicts an apparatus according to an exemplary embodiment of the invention.

FIG. 14 schematically depicts an apparatus according to an exemplary embodiment of the invention. FIG. 14 shows a schematic diagram of the multiple material SLM system. A special multiple material SLM prototype equipment was de-signed and manufactured in this study (see FIG. 14). An x-y-z galvo scanner (Nutfield, 3XB 3-Axis) was used to scan the laser beam with an 80 µm beam spot size generated from a 500 W Ytterbium Single-mode, continuous wave (CW) fibre laser (IPG Photonics, YLR-500-WC) of a 1070 nm wavelength over the target powder bed. A multiple powder delivery system was developed combining a traditional roller assisted powder bed delivery mechanism spreading the main building material (316L in this study) with a point by point vacuum sucker for selective, precision single layer powder removal at specific locations, and several ultrasonic dry powder dispensers, accurately depositing In718 and Cu10Sn powders respectively according to the designed pattern. The ultrasonic powder dispensers were mounted on an x-y linear stage along with the vacuum sucker. The process operation was in an inert gas environment filled with nitrogen or argon gas having an oxygen gas level less than 0.3% monitored with a real-time built-in oxygen sensor. Before filling in the inert gas, the operation chamber was vacuumed down to 40 Pa with a vacuum pump. A fume exaction system was built into the system to remove fumes generated. Although the system had a built-in pre-heating facility, this was not used in the present investigation. A schematic diagram of the experimental set up is shown in FIG. 14.

Figure 15A:
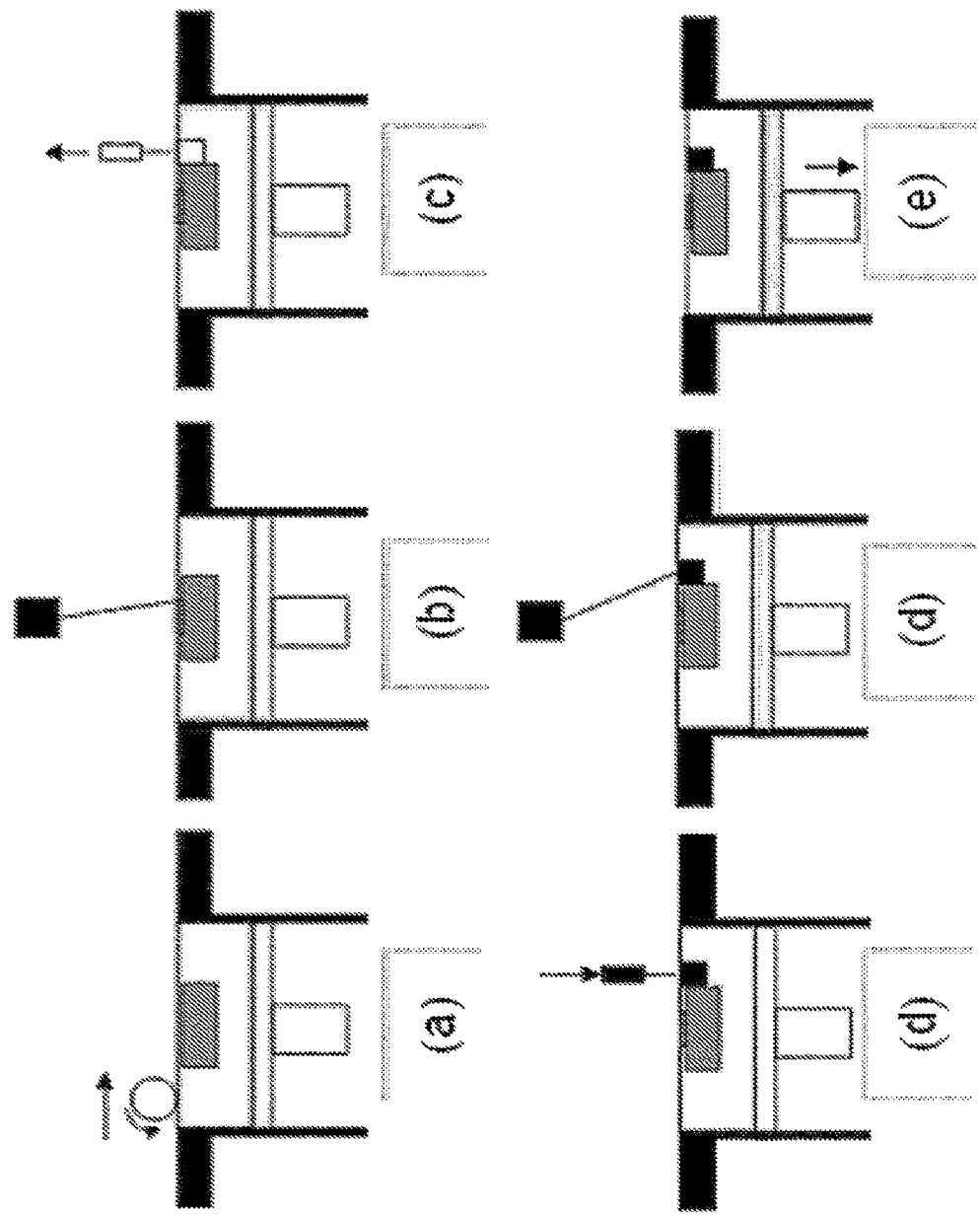
FIG. 15A schematically depicts a process of additive manufacturing according to an exemplary embodiment of the invention.

FIG. 15A schematically depicts a process of additive manufacturing according to an exemplary embodiment of the invention. Particularly, FIG. 15A shows the process flow chart of multiple materials SLM. FIG. 15A describes the multiple material SLM process implemented in this investigation. Firstly the main powder material, i.e. 316L was spread for one layer of 50 µm thickness over the substrate with a motorized roller and powder levelling blades. Then the laser beam melted the desired areas. A selective powder removal process then took place to remove powders of a single layer thickness in defined areas, using the vacuum sucker. The second/third material powders (In718/Cu10Sn) were then dispensed into vacuum sucked areas using the ultrasonic powder dispensers and then melted by the laser beam and bonded with the already melted area. Finally, the building platform moved down a distance equal to the layer thickness. All above 6 steps were repeated until the whole 3D model was fabricated.

Figure 15B:
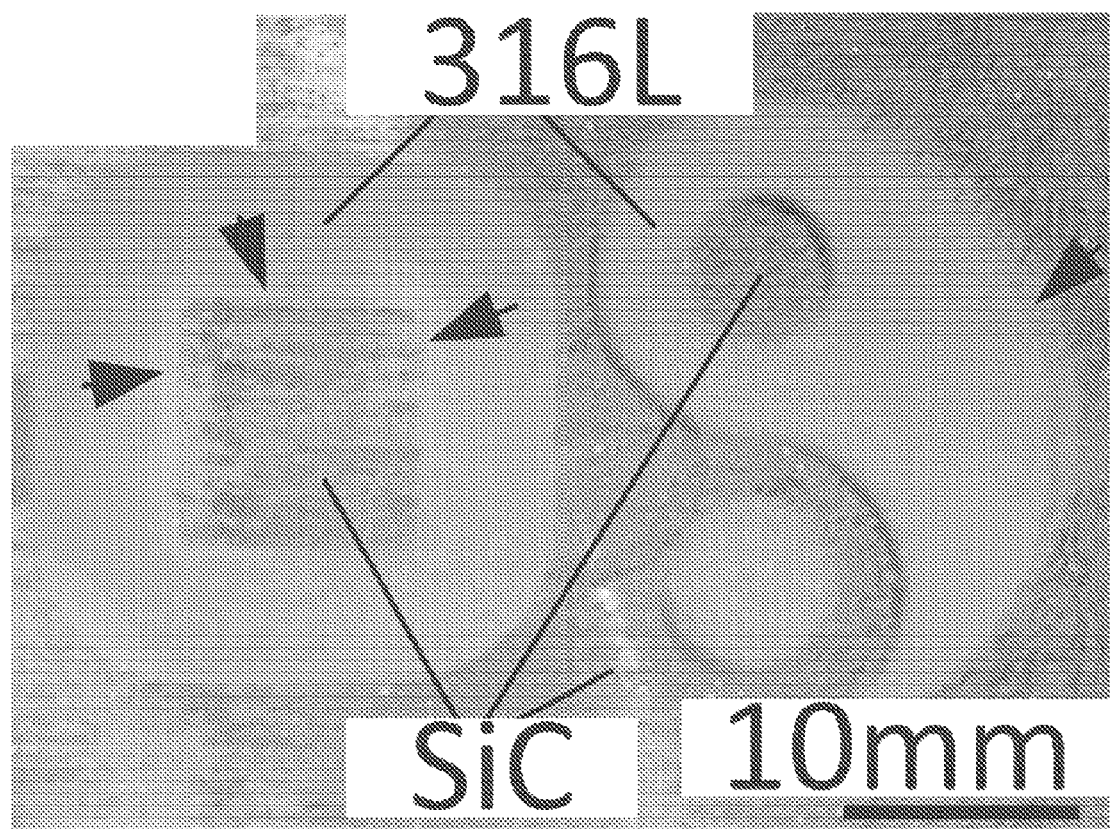
FIG. 15B depicts an optical photograph of first material and second material deposited by the apparatus according to FIG. 14.

FIG. 15B depicts an optical photograph of first material and second material deposited by the apparatus according to FIG. 14. Particularly, FIG. 15B shows a Cu10Sn box and half Yingyang pattern produced by selective powder vacuum sucking and ultrasonic deposition on a 316L powder layer before fusing. FIG. 15B demonstrates a preliminary experimental sample produced by selective powder vacuum sucking and ultrasonic deposition (Cu10Sn) on a 316L powder bed layer before laser fusion. There were some margins close to the edges as indicated by the red arrows, due to the width of the expanding zone of the vacuum sucking nozzle being larger than the tool path offset value. Such a problem was solved by vacuum sucking tool path optimization in the following experiments.

Figure 16:
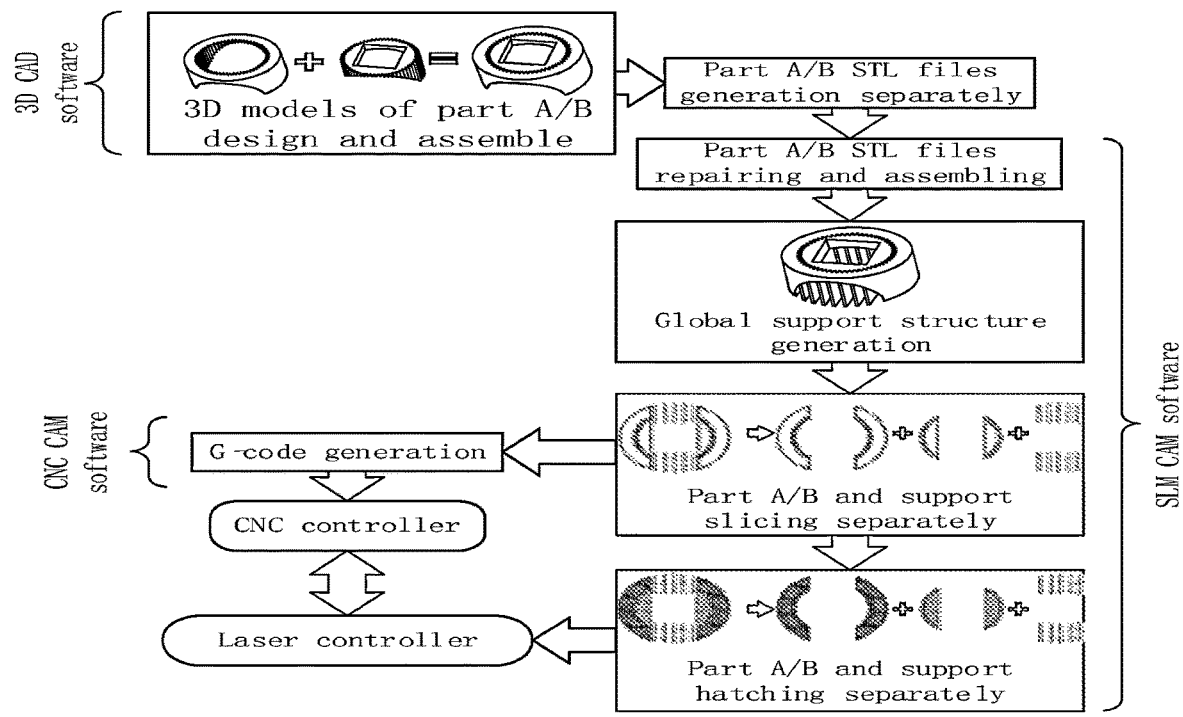
FIG. 16 schematically depicts a part of the process of additive manufacturing according to FIG. 11, in more detail.

FIG. 16 schematically depicts a part of the process of additive manufacturing according to FIG. 11, in more detail. Since there have been no software tools for multiple material SLM, a new data preparation procedure and tool was developed. As illustrated in FIG. 16, a multiple-material component was considered as an assembly, comprised of a set of single material parts. All these parts were designed with special features on the material interface in order to enhance the bond. They were then assembled together into a single component. At the SLM process data preparation stage, all the individual material geometry was converted into an STL format. The global support structure was then created after all the STL files for each material were assembled together. Subsequently, the slicing and hatching took place for each material separately and the results were exported into the laser control system. The tool paths and CNC G-codes for the selective powder vacuum removal and ultrasonic powder depositing were prepared by a proprietary CNC CAM software tool. The laser process parameters for fusing 3 materials used in this investigation are presented in Table 4. These were derived from numerous experiments to achieve optimum melting quality and processing efficiency.

TABLE 4

Optimum laser process parameters for multiple material SLM.

| Material | 316L | In718 | Cu10Sn |
|---|---|---|---|
| Laser power (W) | 170 | 180 | 125 |
| Scan speed (mm/s) | 800 | 857 | 150 |
| Hatch distance (µm) | 45 | 45 | 140 |
| Relative hatch angle (°) | 90 | 90 | 90 |
| Layer thickness (µm) | 50 | 50 | 50 |

Material Characterization

Cross-sections of the SLM parts were prepared by cutting, mounting, grinding with 400 #, 800 #, 1000 #, and 1200 # grid emery papers, and finally polished using 1.0 µm diamond polishing paste. The polished samples were electro-etched in 10 vol. % oxalic acid solution. Optical microscopic images of material interfaces were acquired using a Leica DM2700-M microscope. A Durascan-80 hardness tester was used to measure the Vickers microhardness on the samples with a 0.3 kgf applied load on the Cu10Sn part and a 0.5 kgf on the 316L/In718 part. The interfaces between 316L/In718 and 316L/Cu10Sn were examined using a scanning electron microscope (SEM, Zeiss Sigma VP FEG SEM) equipped with energy dispersive spectroscopy (EDS, Oxford Instruments X-maxN 150) for elemental mapping.

Experimental Results

Figure 17:
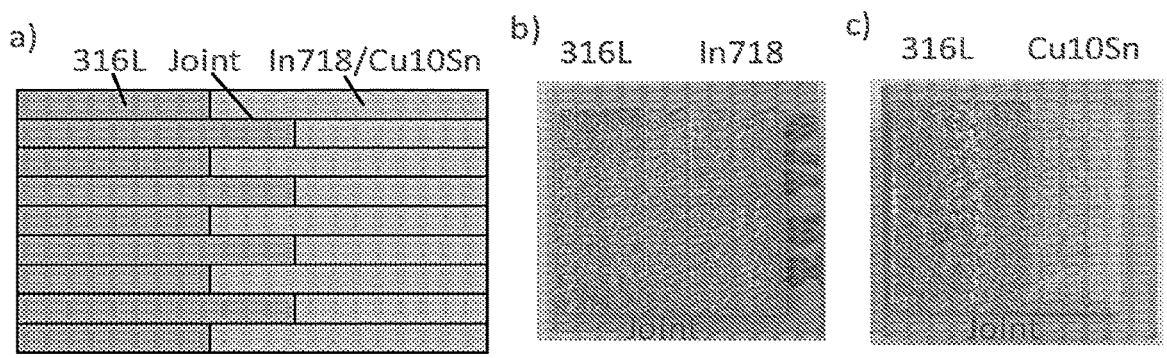
FIG. 17A schematically depicts first material and second material deposited by the apparatus according to FIG. 14 and FIGS. 17B to 17C depict optical photographs of first material and second material deposited by the apparatus according to FIG. 14.

FIG. 17A schematically depicts first material and second material deposited by the apparatus according to FIG. 14 and FIGS. 17B to 17C depict optical photographs of first material and second material deposited by the apparatus according to FIG. 14. Particularly, FIGS. 17A to 17C show experimental samples to study the multiple material interfaces: FIG. 17A shows a schematic of the "figure-cross" dual material interfaces; and FIGS. 17B and 17C are the top view of the processed 20×20 mm 316L/In718 and 316L/Cu10Sn samples respectively. Special 20 mm×20 mm square multi-layer samples having a 4 mm width "finger cross" joint zone were printed to investigate multiple material interfaces as shown in FIG. 17A for 316L/In718 and 316L/Cu10Sn dual material samples (FIGS. 17B and 17C).

Figure 18:
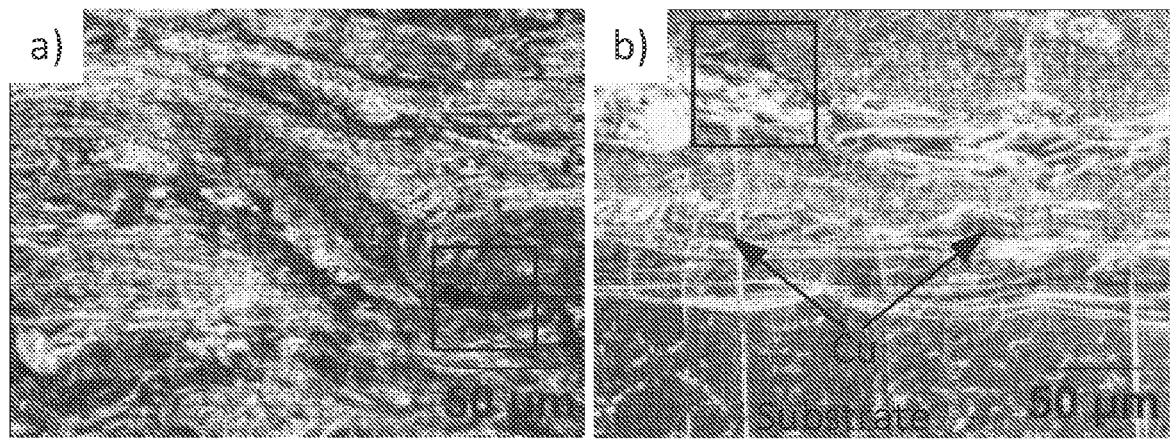
FIGS. 18A to 18B depict optical photographs of the first material and second material of FIGS. 17B and 17C respectively, in more detail.
Figure 19:
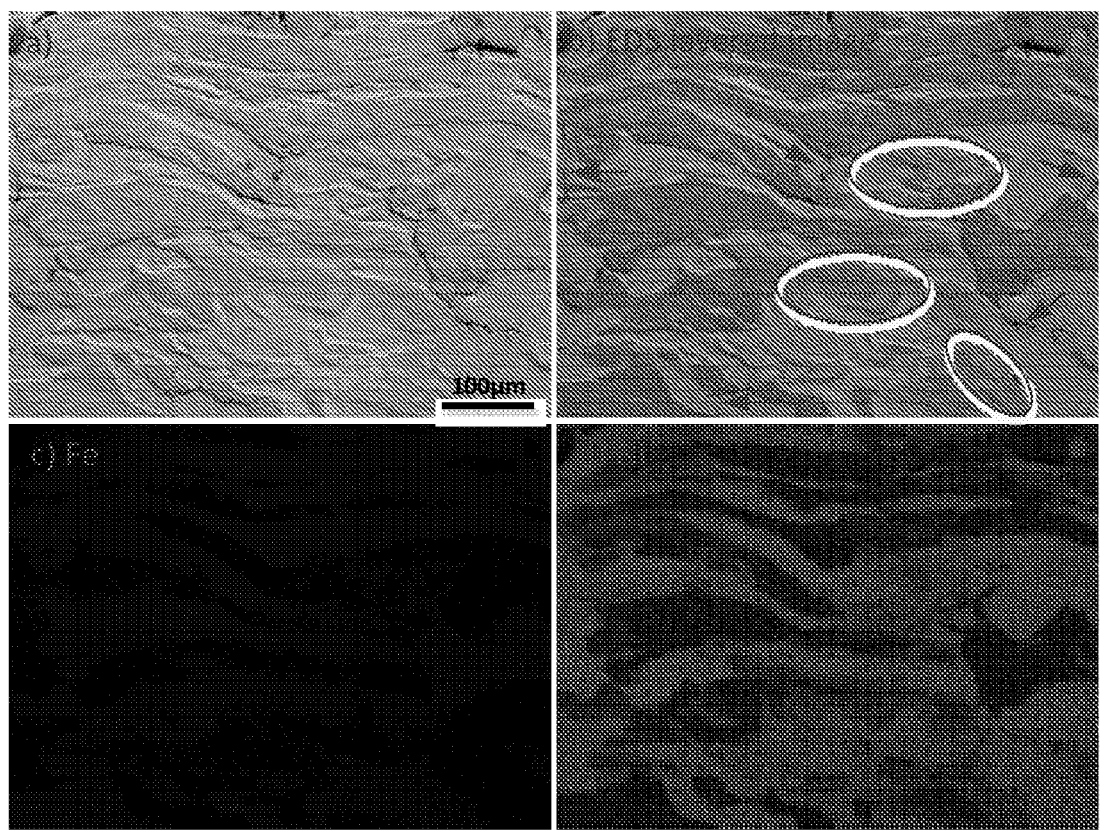
FIG. 19A depicts a scanning electron microscope (SEM) image of the first material and second material of FIG. 18A and FIGS. 19B to 19D depict corresponding energy dispersive spectroscopy (EDS) images of the first material and second material of FIG. 19A.

FIGS. 18A to 18B depict optical photographs of the first material and second material of FIGS. 17B and 17C respectively, in more detail. Particularly, FIGS. 18 to 18B show optical microscopic images of multiple material interfaces: FIG. 18A shows 316L/In718 interfaces far from the substrate; and FIG. 18B shows 316L/Cu10Sn interface close to the substrate. The optical microscopic images of the cross-sectional view of the multiple material interfaces are shown in FIGS. 18A to 18B where some pores were found in the ultrasonic deposited powder area in FIG. 18A. FIG. 18B presents a good bond between 304 SS substrate, 316L SS layer and the Cu10Sn layer. There was also an evidence of Cu infiltrating into the previously melted 316L layer (see positions pointed by arrows in FIG. 18B FIG. 19A depicts a scanning electron microscope (SEM) image of the first material and second material of FIG. 18A and FIGS. 19B to 19D depict corresponding energy dispersive spectroscopy (EDS) images of the first material and second material of FIG. 19k Particularly, FIGS. 19A to 19D show SEM image and EDS mappings of 316L-In718 interfaces. FIG. 19A shows an SEM image of 316L-In718 interfaces; FIG. 19B shows a EDS mapping of the 316-In718 interfaces; FIG. 19C and FIG. 19D show the Fe and Ni mapping of the 316L-In718 interfaces, respectively. FIG. 19A presents an SEM image of the region described in FIG. 19A, in which some cracks were observed. The EDS mapping results (FIGS. 19B to 19D) show that most of such defects were distributed in the In718 alloy powder region as indicated by the red arrows, deposited by the ultrasonic nozzle. Some 316L/In718 intermixed regions were also found as shown in the elliptic regions in FIG. 19B. A suitable material matrix would be able to achieve a lower Weight-Bulk Ratio, and higher hardness or toughness. In previous studies, a pre-mixed material was used to achieve this, while our study demonstrated that materials could be mixed in the designed regions to achieve required transition properties.

Figure 20:
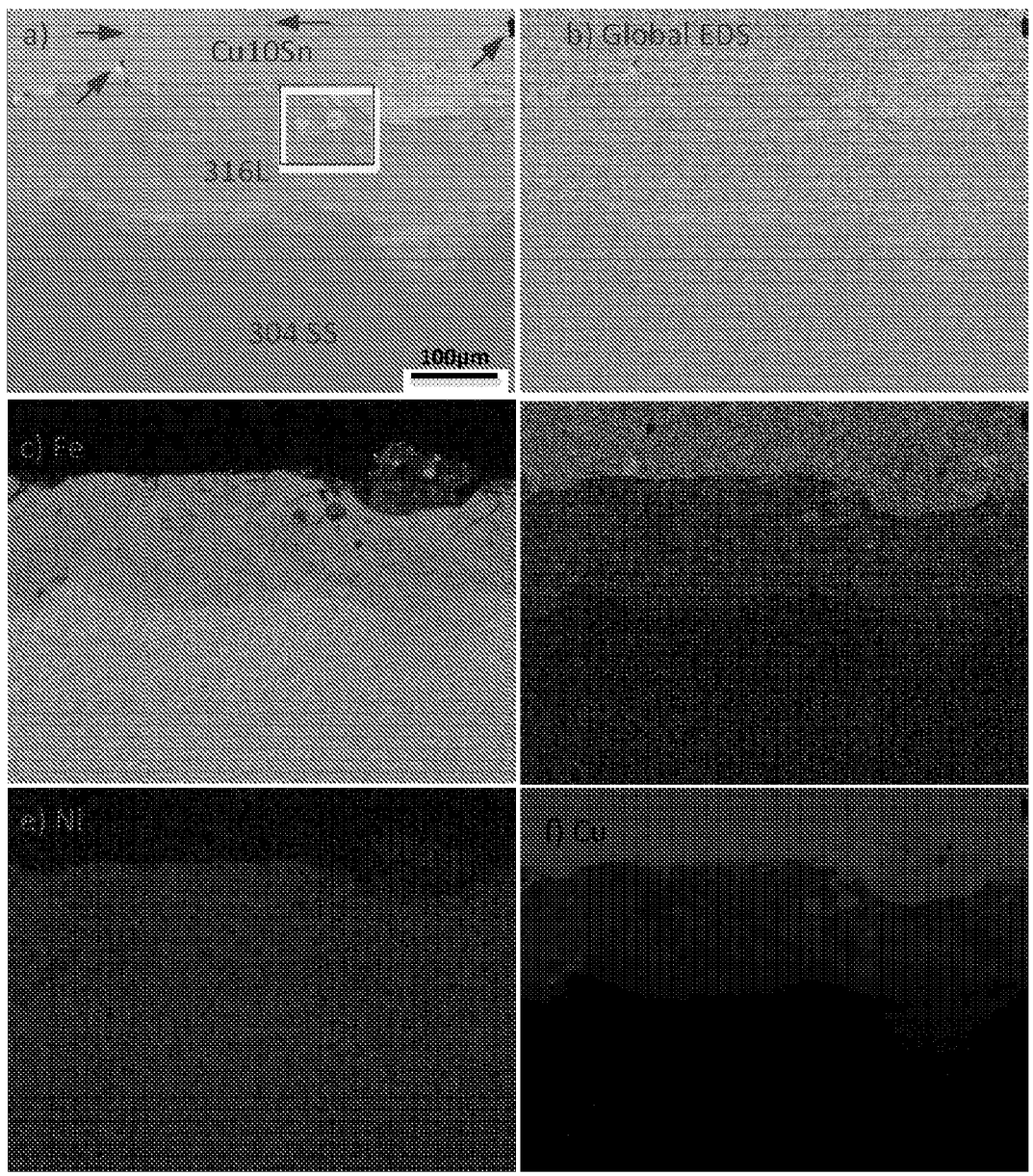
FIG. 20A depicts a scanning electron microscope (SEM) image of the first material and second material of FIG. 18B and FIGS. 20B to 20F depict corresponding energy dispersive spectroscopy (EDS) images of the first material and second material of FIG. 20A.

FIG. 20A depicts a scanning electron microscope (SEM) image of the first material and second material of FIG. 18B and FIGS. 20B to 20F depict corresponding energy dispersive spectroscopy (EDS) images of the first material and second material of FIG. 20A. Particularly, FIG. 20A to 20F show an SEM image and EDS mappings of 316L-Cu10Sn interfaces. FIG. 20A shows the SEM image of 316L-Cu10Sn interfaces; FIG. 20B shows an EDS mapping of the 316L-Cu10Sn interfaces; and FIGS. 20C to 20F show the Fe, Sn, Ni and Cu mapping of the 316L-Cu10Sn interfaces, respectively. SEM evaluation of the 316L/Cu10Sn specimen (FIG. 20A), revealed sound metallurgical bonding at the interface of 316L/Cu10Sn and the interface between 316L and the 304 substrate. No apparent defects were present in the fused 316L region with layers added through the powder-spread roller. On the other hand, some porosity and cracks were observed in the ultrasonic dispensed Cu10Sn powder region indicated by the arrows. Besides, some isolated light zones, as marked by a rectangle in FIG. 20A, were present in the 316L powder area. Further EDS inspection (FIG. 20F) showed the chemical composition of such zones as Cu, indicating that Cu element diffused into the Fe area. A dual powder mixing zone was found in the top right of the scanned area by comparing FIG. 20C and FIG. 20F. This could be due to insufficient 316L powder vacuum removal. Some residuals of 316L powder were blended with the deposited Cu10Sn powder and fused by the subsequent laser fusing process.

Figure 21:
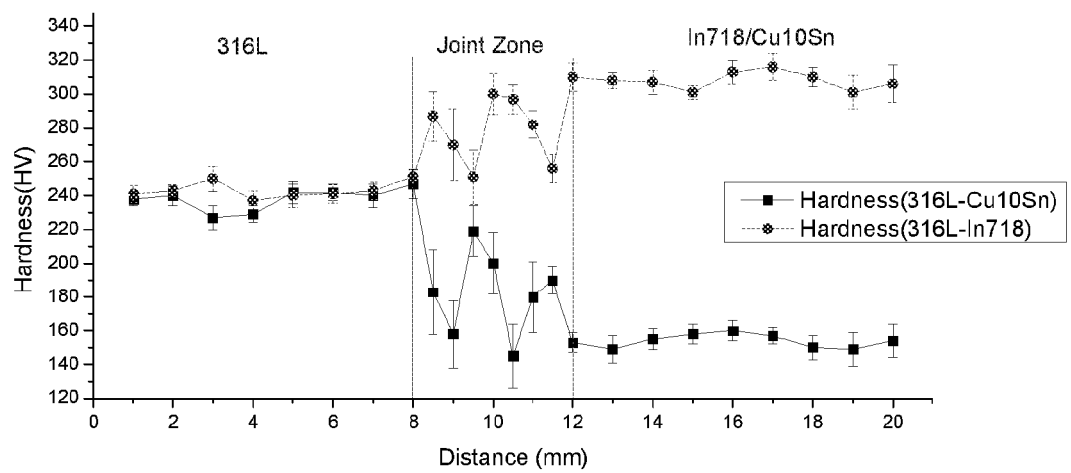
FIG. 21 depicts graphs of Vickers hardness of the first material and second material of FIGS. 17B and 17C.

FIG. 21 depicts graphs of Vickers hardness of the first material and second material of FIGS. 17B and 17C. Particularly, FIG. 21 shows Vickers hardness values along the horizontal direction of the SLM 316L/In718 sample and the SLM 316L/Cu10Sn sample. The Vickers hardness values along the horizontal direction of the SLM samples made of dual materials are shown in FIG. 21. It can be seen that the hardness values of 316L part ranged from 237±6 HV to 251±4 HV and those of In718 part ranged from 301±4 HV to 310±6 HV with the transition zone having hardness values between those of the two materials. The hardness values of 316L and Cu10Sn on the 316L/Cu10Sn sample were 227±7 HV to 247±8 HV and 149±8 HV to 160±6 HV respectively while the hardness values in the transition zone ranged between those of the two materials. Due to the special "finger cross" joint structure design, better material elemental diffusion and bonding were achieved. It is noted that the values of microhardness standard deviation were much higher in the transition zones comparing with those in the single material region as shown in both curves.

Figure 22:
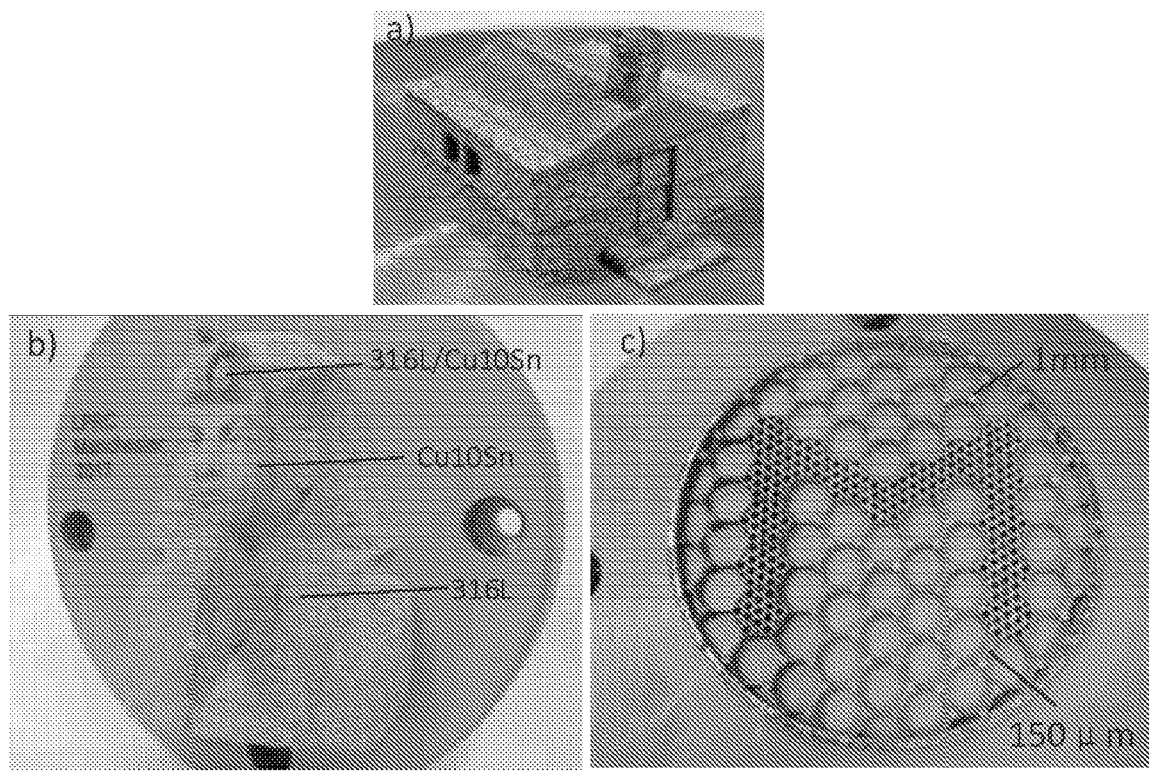
FIGS. 22A to 22C depict optical photographs of first material and second material deposited by the apparatus according to FIG. 14.

FIGS. 22A to 22C depict optical photographs of first material and second material deposited by the apparatus according to FIG. 14. Particularly, FIG. 22A shows a mini house comprised 3 materials; FIG. 22B shows a multiple color, multi-material statue of Sphinx; and FIG. 22C shows a dual color grid pattern. To demonstrate 3D multiple material printing using the SLM, a set of 3D complex shapes were manufactured using the proprietary system. As shown in FIG. 22A, the doorstep and the chimney of a simple house were made of Cu10Sn and In718 respectively, while the rest of the house was made of 316L material. In FIGS. 22B and 22C, golden and silver colors represent the Cu10Sn and 316L material separately. It is notable that the snake headwear of the Sphinx (FIG. 22B) was made of 316L/Cu10Sn material matrix using the local powder mixing strategy, while the face was made of Cu10Sn and the rest was made of 316L stainless steel. The thin wall structures and dot diameter as shown in FIG. 22C were 150 μm in thickness and 1 mm in diameter respectively.

Figure 23:
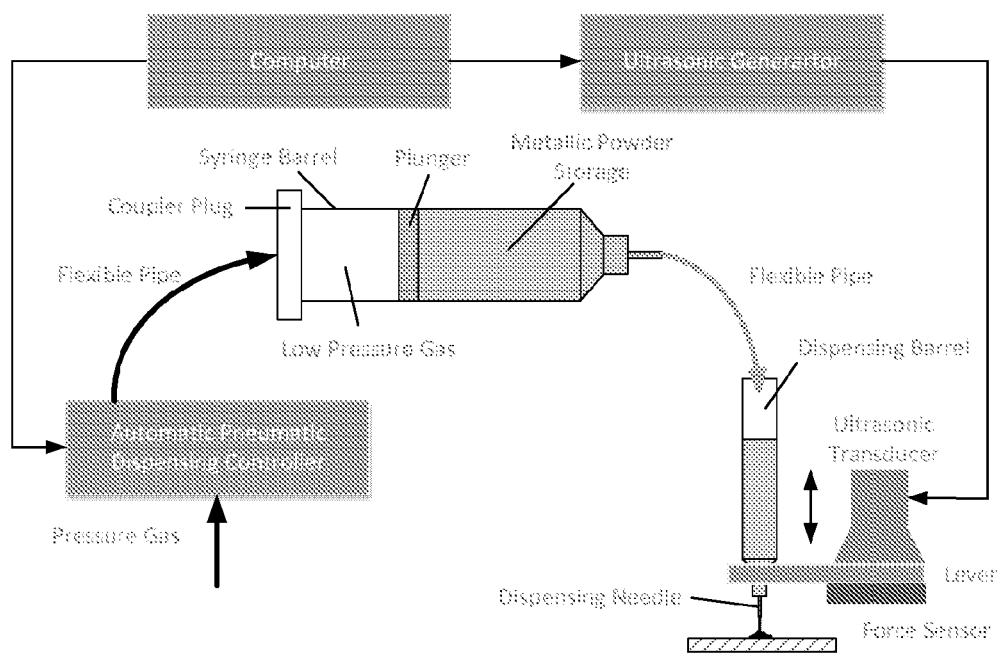
FIG. 23 schematically depicts a part of an apparatus according to an exemplary embodiment of the invention.

FIG. 23 schematically depicts a part of an apparatus according to an exemplary embodiment of the invention. Particularly, FIG. 23 illustrates the selectively dry powder dispenser used in this work. In the hybrid powder-bed and ultrasonic nozzle powder delivery system for 3D printing of multiple materials, the use of small ultrasonic delivery hopper and nozzle would enable high resolution and stability of material feeding, However, it can only last for a short period of time, thus not suitable for printing large parts. A cascaded powder delivery system as shown in FIG. 23 enables both accurate and stable powder delivery as well as powder material supply to allow the printing of large components. The secondary powder supply system is a pressure gas driven powder storage unit and is integrated with the ultrasonic dispenser. The automatic pneumatic dispensing controller allows continuous or non-continuous timed supply powders to the dispending barrel. The powders can be metallic, ceramic or polymer type or their mixture depending on the application needs.

This work demonstrated a multiple material SLM technology by combining conventional powder-bed spreading with point-by-point multiple material selective powder removal and dry powder delivery, for the first time. A proprietary experimental SLM equipment and special multiple material CAD data preparation procedure for SLM were developed and employed to produce 316L/In718 and 316L/Cu10Sn samples successfully. The feasibility to deposit multiple materials on the same building layer and across different layers was confirmed by the experiment results. A clear distinct sandwich layer distribution and a good metallurgical bonding were obtained at the material interfaces for the material combinations studied. The result also indicated that the special material interface design was helpful to enhance material elemental diffusion, which leads to better bonding. On the other hand, some defects including holes and cracks were found in the ultrasonically deposited powder region due to uneven powder distribution. Particularly, this work demonstrates a new approach for multiple material SLM suitable to printing multiple metallic 3D components by combining powder-bed spreading, point-by-point multiple nozzles ultrasonic dry powder delivery, and point-by-point single layer powder removal to realize multiple material fusion within the same layer and across different layers.

In summary, the invention provides an apparatus for additive manufacturing and a method thereof of a part of an article from a first material comprising particles having a first composition. A second material, comprising particles having a second composition, different from the first composition, provides a support material, arrangeable to support the build material during, for example, intermediate stages of additive manufacturing. The second material may be thus used to provide a support structure during additive manufacturing of the part of the article and/or of the article. Since the first composition and the second composition are different, their respective properties may be selected according to their respective uses, thereby facilitating removal of the second material, such as the support structure, while reducing consumption of the first material. Furthermore, reuse or recycling of the first material and/or the second material is improved since cross-contamination of the first material and the second material is reduced. In this way, the apparatus for additive manufacturing of the part of an article involves selective material removal in each layer of the first material following the standard powder bed selective laser melting of the first material. This is then followed by selective point-by-point powder or powder-liquid material deposition of a second material, followed by selective laser melting or other means of joining of the second material, optionally including jetting of a polymeric binder. Multiple materials can be deposited in each layer using the said selective material deposition. The process may be repeated for the following (i.e. subsequent) layers (i.e. that overlay the layer) until the entire article is formed. Third, fourth and more different types of materials may be deposited in a similar manner. Particularly, this permits forming of articles from a plurality of materials within a particular layer (i.e. intralayer) and/or in successive layers (i.e. interlayer), thereby enhancing structure, function and/or properties of articles created in this way.

Attention is directed to all papers and documents which are filed concurrently with or previous to this specification in connection with this application and which are open to public inspection with this specification, and the contents of all such papers and documents are incorporated herein by reference. All of the features disclosed in this specification (including any accompanying claims and drawings), and/or all of the steps of any method or process so disclosed, may be combined in any combination, except combinations where at least some of such features and/or steps are mutually exclusive. Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. An apparatus for additive manufacturing of a part of an article from a first material comprising particles having a first composition, the apparatus comprising:
   a layer providing means, comprising a retractable bed provided in a chamber and a roller or a scraper, for providing a first layer from a second material comprising particles having a second composition, wherein the first composition and the second composition are different;
   a concavity defining means for defining a first concavity in an exposed surface of the first layer, wherein the concavity defining means comprises a vacuum apparatus having a vacuum nozzle arrangeable proximal the exposed surface of the first layer, wherein the vacuum apparatus is controllable to selectively remove a part of the second material by vacuum suction, thereby defining the first concavity in the exposed surface of the first layer;
   a depositing means for depositing a part of the first material in the first concavity defined in the first layer, wherein the depositing means comprises a printing head including a deposition nozzle having an orifice;
   a levelling means for selectively levelling the deposited first material in the first concavity; and
   a first fusing means for fusing some of the particles of the levelled first material in the first concavity by at least partially melting said particles, thereby forming a first part of the layer of the article.

2. The apparatus according to claim 1, wherein the vacuum apparatus is configured to remove at most a thickness of the first layer and/or wherein the vacuum apparatus is configured to define the first concavity having a flat base.

3. The apparatus according to claim 1, wherein the apparatus is arranged to control a gas flow rate through the vacuum nozzle, a position of the vacuum nozzle, a separation of the vacuum nozzle from the exposed surface of the first layer and/or a speed of movement of the vacuum nozzle to define, at least in part, a shape of the first concavity.

4. The apparatus according to claim 1, wherein a bore, an internal shape, an external shape and/or an internal diameter of the vacuum nozzle is selected to define, at least in part, a shape of the first concavity.

5. The apparatus according to claim 1, wherein the vacuum nozzle has an internal diameter in a range from 10 μm to 800 μm.

6. The apparatus according to claim 1, wherein the vacuum nozzle is arranged to translate above the exposed surface of the first layer at a height in a range from 0.5 mm to 1.5 mm.

7. The apparatus according to claim 1, wherein the vacuum apparatus has a plurality of vacuum nozzles, wherein each vacuum nozzle of the plurality of vacuum nozzles may be separately fluidically coupled to a different particle tank.

8. The apparatus according to claim 1, wherein the levelling means is arranged to level an exposed surface of the deposited first material coincidently with the exposed surface of the first layer and/or wherein the deposition nozzle comprises the levelling means arranged proximal an orifice of the deposition nozzle.

9. The apparatus according to claim 8 wherein the levelling means is a deposition scraper comprising an annulus arranged to scrape the first material during deposition thereof and wherein the annulus is provided by an outer sleeve around the deposition nozzle, wherein the outer sleeve projects beyond an end of the deposition nozzle.

10. The apparatus according to claim 1, wherein the deposition nozzle has an internal diameter in a range from 200 μm to 750 μm.

11. The apparatus according to claim 1, wherein the depositing means is arranged to translate above the exposed surface of the first layer and/or above a base of the first cavity at a height in a range from 0.2 mm to 1 mm.

12. The apparatus according to claim 1, wherein the levelling means is arranged to selectively level the deposited first material in the first concavity concurrently with depositing the part of the first material in the first concavity defined in the first layer.

13. The apparatus according to claim 1, wherein the depositing means comprises a cascaded powder delivery system including a pressure gas driven powder storage unit integrated with an ultrasonic dispenser.

14. A process of additive manufacturing of a part of an article from a first material comprising particles having a first composition, the process comprising steps of:
  (i) providing a first layer from a second material comprising particles having a second composition, wherein the first composition and the second composition are different;
  (ii) defining a first concavity in an exposed surface of the first layer by vacuuming a part of the second material;
  (iii) depositing a part of the first material in the first concavity defined in the first layer;
  (iv) selectively levelling the deposited first material in the first concavity;
  (v) fusing at least some of the particles of the levelled first material by at least partially melting said particles, thereby forming a first part of a layer of the article; and optionally, repeating one or more of steps (i) to (v).

15. The process according to claim 14, comprising a step of removing at least some unfused particles of the deposited first material and/or comprising a step of fusing at least some of the particles of the second material.

16. The process according to claim 14, wherein the step defining the first concavity in the exposed surface of the first support layer comprises removing the part of the second material to at most a depth of the first support layer.

17. The process according to claim 16 wherein removing the part of the second material comprises vacuuming the part of the second material.

18. The process according to claim 14, wherein the step of selectively levelling the deposited first material in the first concavity comprises levelling an exposed surface of the part of the deposited first material coincidently with the exposed surface of the first layer.

19. The process according to claim 14, wherein a part of the second material is obtained from another layer.

20. The process according to claim 14, comprising steps of:
  (vi) defining a second concavity in the first layer;
  (vii) depositing a part of a third material comprising particles having a third composition in the second concavity defined in the first layer, wherein the first composition, the second composition and the third composition are different;
  (viii) selectively levelling the deposited third material in the second concavity; and
  (ix) fusing a part of the deposited third material, thereby forming a second part of the layer of the article from the fused part of the third material.

* * * * *